(12) United States Patent
Kuo et al.

(10) Patent No.: US 8,014,301 B2
(45) Date of Patent: Sep. 6, 2011

(54) SYSTEM AND METHOD FOR PROVIDING NETWORK ROUTE REDUNDANCY ACROSS LAYER 2 DEVICES

(75) Inventors: Andrew Tai-Chin Kuo, Newark, CA (US); Ivy Pei-Shan Hsu, Pleasanton, CA (US); Jordi Moncada-Elias, Milpitas, CA (US); Rajkumar Jalan, Saratoga, CA (US); Gurudeep Kamat, Mountain View, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 153 days.

(21) Appl. No.: 12/477,069

(22) Filed: Jun. 2, 2009

(65) Prior Publication Data
US 2009/0296565 A1 Dec. 3, 2009

Related U.S. Application Data

(63) Continuation of application No. 11/695,458, filed on Apr. 2, 2007, now Pat. No. 7,558,195, which is a continuation of application No. 10/124,449, filed on Apr. 16, 2002, now Pat. No. 7,209,435.

(51) Int. Cl.
*H04L 12/56* (2006.01)
*H04J 1/16* (2006.01)
(52) U.S. Cl. .................. 370/242; 219/252; 219/386
(58) Field of Classification Search .................. 370/219, 370/252, 242, 386
See application file for complete search history.

(56) References Cited

U.S. PATENT DOCUMENTS

| | | | |
|---|---|---|---|
| 5,473,599 A | 12/1995 | Li et al. | |
| 6,032,194 A | 2/2000 | Gai et al. | |
| 6,304,575 B1 | 10/2001 | Carroll et al. | |
| 6,373,826 B1 | 4/2002 | Russell et al. | |
| 6,397,260 B1 | 5/2002 | Wils et al. | |
| 6,470,395 B1 | 10/2002 | Van Aken et al. | |
| 6,493,825 B1 | 12/2002 | Blumenau et al. | |
| 6,501,756 B1 * | 12/2002 | Katsube et al. | ............... 370/392 |
| 6,535,490 B1 | 3/2003 | Jain | |
| 6,556,541 B1 | 4/2003 | Bare | |
| 6,717,922 B2 | 4/2004 | Hsu et al. | |
| 6,728,777 B1 | 4/2004 | Lee et al. | |
| 6,766,482 B1 | 7/2004 | Yip et al. | |
| 6,839,348 B2 | 1/2005 | Tang et al. | |
| 6,850,531 B1 | 2/2005 | Rao et al. | |

(Continued)

OTHER PUBLICATIONS

U.S. Appl. No. 10/261,946, filed Oct. 1, 2002, Kuo et al.

(Continued)

*Primary Examiner* — John Pezzlo
(74) *Attorney, Agent, or Firm* — Kilpatrick Townsend & Stockton LLP

(57) ABSTRACT

Systems and methods are described for providing network route redundancy through Layer 2 devices, such as a loop free Layer 2 network having a plurality of switching devices. A virtual switch is coupled to the loop free Layer 2 network, the virtual switch having two or more switches configured to transition between master and backup modes to provide redundant support for the loop free Layer 2 network, the switches communicating their status through use of a plurality of redundancy control packets. The system also includes means for allowing the redundancy control packets to be flooded through the Layer 2 network. The means may include time-to-live data attached to the redundancy control packet which is decremented only when the packets are transferred through devices which are configured to recognize the protocol used in redundancy control packets.

21 Claims, 15 Drawing Sheets

U.S. PATENT DOCUMENTS

| | | | |
|---|---|---|---|
| 6,879,594 | B1 | 4/2005 | Lee et al. |
| 6,891,808 | B2 | 5/2005 | Ishii |
| 6,952,397 | B2 | 10/2005 | Mor et al. |
| 6,954,436 | B1* | 10/2005 | Yip et al. ............... 370/254 |
| 7,003,705 | B1 | 2/2006 | Yip et al. |
| 7,126,923 | B1 | 10/2006 | Yang et al. |
| 7,154,861 | B1 | 12/2006 | Merchant et al. |
| 7,209,435 | B1 | 4/2007 | Kuo et al. |
| 7,340,535 | B1 | 3/2008 | Alam |
| 7,359,984 | B1 | 4/2008 | Hackney |
| 7,389,359 | B2 | 6/2008 | Jain et al. |
| 7,389,496 | B2* | 6/2008 | Eckhart et al. ............. 717/127 |
| 7,558,195 | B1 | 7/2009 | Kuo et al. |
| 2002/0131414 | A1 | 9/2002 | Hadzic |
| 2003/0037165 | A1 | 2/2003 | Shinomiva |
| 2003/0048501 | A1 | 3/2003 | Guess et al. |
| 2003/0048746 | A1* | 3/2003 | Guess et al. ............... 370/219 |
| 2003/0179707 | A1 | 9/2003 | Bare |
| 2003/0193959 | A1 | 10/2003 | Lui et al. |
| 2003/0225908 | A1 | 12/2003 | Srinivasan |
| 2006/0092862 | A1 | 5/2006 | Benedetto |
| 2007/0008942 | A1 | 1/2007 | Ocepek et al. |
| 2009/0003213 | A1 | 1/2009 | Tzeng |
| 2009/0274153 | A1 | 11/2009 | Kuo et al. |

OTHER PUBLICATIONS

U.S. Appl. No. 11/695,458, filed Apr. 2, 2007, Kuo et al.
Chakraborty et al, "Improvement in Reliability of the Token Ring Network by Reversal of Token in Case of a Single Component Failure", 1993, IEEE, pp. 1152-1154.
"Understanding Spanning—Tree Protocol," at URL: http://www.cisco.com/univercd/cc/td/doc/product/rtrmgmt/sw_ntman/cwsimain/cwsi2/cwsiug . . . , Printed on Aug. 15, 2002, 8 pages, CISCO Systems Inc.
"Functional Description: Health Check/Fabric Checksum," at URL: http://www.extremenetworks.com/services/HealthCheck.aspx, Printed on Feb. 12, 2002, 5 pages.
"IEEE Std 802.1D, IEEE Standard for Information Technology—Telecommunications and Information Exchange Between Systems—Local and Metropolitan Area Networks—Common Specifications, Part 3: Media Access Control (MAC) Bridges", *ANSI/IEEE Std 802.1D*, 1998 [Incorporates ANSI/IEEE Std. 802.1D, 1993 Edition, IEEE P802.1p, IEEE Std 802.1j-1996, IEEE Std 802.6k-1992, IEEE Std 802.11c-1998, and IEEE P802.12e], 1998, pp. i-xix and 1-355.
"IEEE Std 802.1w, IEEE Standard for Local and Metropolitan Area Networks—Common Specifications, Part 3: Media Access Control (MAC) Bridges—Amendment 2: Rapid Reconfiguration," IEEE Std 802.w-2001 [Amendment to IEEE Std 802.1D, 1998 Edition (ISO/IEC 15802-3:1998) and IEEE Std 802.1t-2001] 2001, pp. i-viii and 1-108.
IEEE Std P802.1s, Draft Standard for Local and Metropolitan Area Networks—Amendment 3 to 802.1q Virtual Bridged Local Area Networks: Multiple Spanning Tree, *IEEE*, P802.1s, D14.1, Jul. 2002, 225 pages.
"Intel RTM Express 460T Standalone Switch Description of Spanning Tree Protocol," at URL: http://support.intel.com/support/express/switches/460/30280.htm, Printed on Aug. 15, 2002, 1 page.
Latif et al. "The IBM 8209 LAN Bridge Token-Ring and Ethernet Networks are Incompatible, but They can be Bridged at the Media Access Control Layer," *IEEE Network*. May 1992. pp. 28-37, IEEE.
Li et al., "Cisco Hot Standby Router Protocol" (HSRP), at URL: http://www.ietf.org/rfc/rfc2281.txt, Mar. 1998, pp. 1-15, Network Working Group, Printed on Jan. 25, 2002.
Minimum Spanning Tree Demonstration Program; at URL: http://www.engr.orst.edu/.about.girardma/javaProgs/minST/MinST.html, Printed on Feb. 12, 2002, 1 page.
Perry et al., "Novell, Source Routing and the Spanning-Tree Protocol," at URL: http://developer.nov/research/appnotes/1991/august/01, Aug. 1991, 38 pages, Printed on Feb. 12, 2002.
"Products—Spanning Tree Software Package", Products, at URL: http://www.tassogroup.com/products.html, Printed on Feb. 12, 2002, 3 pages.

"Redundancy in the Application-Aware Data Center," Tech Brief, Extreme Networks, 6 pages, Copyright 2001, Extreme Networks, Inc., Santa Clara California.
"Virtual Router Redundancy Protocol (vrrp)," at URL: http://www.ietf.org/html.charters/vrrp-charter.html, Printed on Feb. 23, 2002, 31 pages.
"Whatis.com Word of the Day," 2 pages, Copyright 2000-2002, Tech Target.
Non-Final Office Action for U.S. Appl. No. 10/124,449, Mailed Jun. 13, 2006, 17 pages.
Notice of Allowance for U.S. Appl. No. 10/124,449, Mailed Feb. 28, 2007, 9 pages.
Non-Final Office Action for U.S. Appl. No. 10/261,946, Mailed Feb. 1, 2007, 12 pages.
Final Office Action for U.S. Appl. No. 10/261,946, Mailed Sep. 13, 2007, 15 pages.
Non-Final Office Action for U.S. Appl. No. 10/261,946, Mailed Apr. 1, 2008, 9 pages.
Final Office Action for U.S. Appl. No. 10/261,946, Mailed Apr. 22, 2009, 12 pages.
Non-Final Office Action for U.S. Appl. No. 10/261,946, Mailed Nov. 6, 2008, 13 pages.
Non-Final Office Action for U.S. Appl. No. 11/695,458, Mailed Oct. 2, 2008, 11 pages.
Final Office Action for U.S. Appl. No. 11/695,458, Mailed Mar. 19, 2009, 8 pages.
Notice of Allowance for U.S. Appl. No. 11/695,458, Mailed Apr. 16, 2009, 5 pages.
Advisory Action for U.S. Appl. No. 10/261,946, mailed Jan. 16, 2008, 4 pages.
Non-Final Office Action for U.S. Appl. No. 10/090,669, mailed May 27, 2003.
Final Office Action for U.S. Appl. No. 10/090,669, mailed Sep. 18, 2003.
Notice of Allowance for U.S. Appl. No. 10/090,669, mailed Nov. 13, 2003.
Civil Action 10-332—*Brocade Communication Systems, Inc. v. A10 Networks, Inc.*—Civil Cover Sheet, filed on Apr. 23, 2010, 1 page.
Civil Action 10-332—Complaint for Patent Infringement, filed on Apr. 23, 2010, with Exhibits A through G, 131 pages.
Civil Action 10-332—Second Amended and Supplemental Complaint for Patent Infringement, filed on Jul. 16, 2010, with Exhibits A through I, 158 pages.
Civil Action 10-332—Report on the Filing or Determination of an Action Regarding a Patent or Trademark, filed on Aug. 5, 2010, 2 pages.
Civil Action 10-332—Notice of Voluntary Dismissal Without Prejudice, filed on Aug. 5, 2010, 2 pages.
Civil Action—CV10-03428—Complaint for Patent Infringement, Trade Secret Misappropriation, Breach of Contract, Interference with Contract, and Unfair Competition Under Cal. Bus. & Prof. Code §§ 17200 *et seq.*, filed on Aug. 4, 2010, with Exhibits A through M, 196 pages.
Civil Action—Case No. CV10-03443—Complaint for Declaratory Judgment, filed on Aug. 6, 2010, with Exhibits A through I, 153 pages.
Final Office Action for U.S. Appl. No. 10/261,946, mailed on Apr. 27, 2010, 27 pages.
Non-Final Office Action for U.S. Appl. No. 10/261,946, mailed on Sep. 9, 2009, 18 pages.
Civil Action CV10-03428—First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 237 pages, with Exhibits A through P.
Non-Final Office Action for U.S. Appl. No. 10/261,946, mailed on Feb. 10, 2011, 21 pages.
Civil Action CV10-03428—Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 13, 2011, 238 pages, with Exhibits A through P.

Civil Action CV10-03428—Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. Code §§ 17200 et seq., Filed Apr. 29, 2011, 318 pages, with Exhibits A through T.

Civil Action CV10-03428 - A10 Networks, Inc.'s, Lee Chen's, Rajkumar Jalan's, Ron Szeto's, Liang Han's, and Steve Hwang's Answer to Third Amended Complaint, Affirmative Defenses, and A10's Counterclaims, Filed May 16, 2011, 40 pages.

Civil Action CV10-03428—Plaintiffs and Counterclaim Defendants Brocade Communications Systems, Inc. And Foundry Networks, LLC's Answer to Defendant A10 Networks, Inc.'s Counterclaims, Filed May 27, 2011, 12 pages.

Reexamination Documents for U.S. Patent No. 7,558,195, filed Jun. 27, 2011, 63 pages, included: Request for Reexamination Transmittal Form; Request for *Ex Parte* Reexamination; Form PTO/SB/08; Exhibit A—U.S. Patent No. 7,558,195; Exhibit B—Terminal Disclaimer; and Exhibit C—U.S. Patent Publication No. 2003/0048501.

\* cited by examiner

Backup Mode

Master Confirm Mode

Master Mode

SYSTEM AND METHOD FOR PROVIDING NETWORK ROUTE REDUNDANCY ACROSS LAYER 2 DEVICES

CROSS-REFERENCES TO RELATED APPLICATIONS

The present application claims priority from and is a continuation of U.S. Non-Provisional application Ser. No. 11/695,458, filed Apr. 2, 2007, now U.S. Pat. No. 7,558,195, issued Jul. 7, 2009, entitled SYSTEM AND METHOD FOR PROVIDING NETWORK ROUTE REDUNDANCY ACROSS LAYER 2 DEVICES, which is incorporated herein by reference in its entirety for all purposes. U.S. Non-Provisional application Ser. No. 11/695,458 is a continuation of U.S. Non-Provisional application Ser. No. 10/124,449, filed Apr. 16, 2002, now U.S. Pat. No. 7,209,435, issued Apr. 24, 2007, entitled SYSTEM AND METHOD FOR PROVIDING NETWORK ROUTE REDUNDANCY ACROSS LAYER 2 DEVICES, which is incorporated herein by reference in its entirety for all purposes.

The present application also incorporates herein by reference for all purposes the entire contents of U.S. Non-Provisional application Ser. No. 10/090,669, filed Mar. 4, 2002, now U.S. Pat. No. 6,717,922, entitled NETWORK CONFIGURATION PROTOCOL AND METHOD FOR RAPID TRAFFIC RECOVERY AND LOOP AVOIDANCE IN RING TOPOLOGIES.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein generally relates to systems, methods and articles of manufacture for providing route or path redundancy in communications networks. More particularly, the present invention relates to systems and methods for providing route redundancy across Layer 2 devices, as well as selected ports on L2 devices.

In recent years, the bandwidth in Local Area Networks (LAN) has increased rapidly, driven by the widespread adoption of Gigabit Ethernet (GbE), while bandwidth capacity in wide area networks (WAN) has exploded, driven by the proliferation of Dense Wave Division Multiplexing (DWDM) technology and high-speed OC-48/192 links. As a result, the new bottleneck is in the MAN, the traffic intersection of the LAN and WAN and the natural home for much of the world's bandwidth and next-generation network services. For this reason, the Metropolitan Area Networks (MAN) has emerged as a key network build-out point.

A MAN typically spans a single urban metropolitan environment and is one of the most important locations in the network today. Because the MAN resides in the crucial location between users and the core of the Internet, it must offer both the intelligence and bandwidth for service providers to deploy profitable new services. Enterprises are also deploying new MANs to obtain high speed site connectivity for storage networking, videoconferencing, IP telephony, supplier integration, and more. MANs, however present an environment that demands a design methodology that is highly resilient and can make any network outage seem transparent to the user by providing alternate routes around any outage.

Many MANs are moving towards a design topology primarily comprising a vast Layer 2 switched network in order to avoid latency problems associated with the use of Layer 3 devices such as routers. In a switched network, all hosts or end nodes connected to the same physical LAN segment reside in the same broadcast domain, which has the potential of flooding the network with traffic and making it essentially unusable as the network grows. VLANs are used by switches to create a division of the physical network segments into separate broadcast domains without the latency problems associated with routers. A router or device acting as such, however, is still needed to move between broadcast domains. The use of switches and VLANs allows a LAN to be created that is independent of physical location by grouping users into logical workgroups. Massive switched topologies such as MANs, therefore, require redundancy to be extended to Layer 2 as well as Layer 3 devices.

Among Layer 3 (L3) devices, techniques have been developed to provide failover between groups of L3 acting in concert as a virtual L3 device. One prominent protocol for providing this failover functionality is the Virtual Router Redundancy Protocol (VRRP). According to this protocol, multiple L3 devices connected to a network segment or segments are associated with a virtual address, which is provided to all hosts on the managed segment or segments. Only one of the L3 devices forming the virtual device, however, is active and utilizing the virtual address. When the active device experiences a failure, another device takes control of the virtual address and continues to route packets between the managed network segment and the outside network, ensuring continuous service at Layer 3.

Another solution to providing L3 failure protection is presented in U.S. Pat. No. 5,473,599, entitled "Standby Router Protocol" and assigned to Cisco Systems, Inc. According to this patent, a system and protocol are provided for routing data packets from a host on a LAN through a virtual address belonging to a group of routers. An active router in the group of routers emulates the virtual router. The host does not know which router from the group is actually handling the data packets it sends. If the standby router becomes inoperative or takes over for the active router, other routers in the group hold an election to determine which of them should take over for the standby router.

With regard to connectivity among Layer 2 (L2) devices, a primary concern is to avoid endless network loops. Endless loops occur in a network when multiple active paths are present between hosts on a network. When loops occur, hosts appear on multiple interfaces on some devices. This condition confuses the forwarding algorithm and allows duplicate frames to be forwarded to the same device, perhaps endlessly. Spanning-Tree Protocol (STP) eliminates this condition by forcing certain redundant data paths into a blocked or standby state. STP operates transparent to end stations, which are unaware whether they are connected to a single LAN segment or a switched LAN comprising multiple segments.

All switches in an extended LAN participating in STP gather information on other switches in the network through an exchange of data messages, referred to as bridge protocol data units (BPDU). The BPDU messages contain information about the transmitting switch and its ports, including switch and port Media Access Control (MAC) addresses, switch priority, and port cost. The exchange of messages results in the election of a unique root switch for the stable topology. The exchange further results in the election of a designated switch for every switched LAN segment and the removal of loops in the switched network by placing redundant switch ports in a back up state.

Unfortunately, VRRP and STP are unable to work together in concert on L2 devices to provide failover recovery while preventing network loops. STP cannot work with VRRP to coordinate multiple devices in a virtual L2/L3 device because the two operate independently from one another on different layers of the Open Systems Interconnection (OSI) multilayered communication model. Telecommunication traffic is divided into seven layers under the OSI model, the layers themselves spilt into two groups. The upper four layers are used whenever a message passes to or from a user. The lower three layers (up to the network layer) are used when any message passes through the host computer, whereas messages intended for the receiving computer pass to the upper layers. Messages destined for some other host are not passed up to the upper layers but are forwarded to another host. Layer 2 refers to the data-link layer, which provides synchronization for the physical level and furnishes transmission protocol knowledge and management. Layer 3, the network layer, handles the routing of the data, e.g., sending it in the right direction to the right destination on outgoing transmissions and receiving incoming transmissions at the packet level.

Proposed solutions to the redundancy problem in massive switched L2/L3 networks have been unsatisfactory. One of these proposed solutions is presented by Extreme Networks' Extreme Standby Router Protocol (ESRP), which provides both a Layer 3 default router and Layer 2 loop redundancy mechanisms. In ESRP, however, the router interface is shut down when acting as a backup device. By shutting down the router interface, the ESRP approach rules out remote management through the VLAN or VLANs that are controlled according to ESRP. Furthermore, the ESRP protocol can only achieve a limited number of redundancy levels (approximately four levels of redundancy) among groups of ESRP switches providing redundancy among each other. In addition to the foregoing, ESRP lacks any authentication mechanism in order to prevent malicious or fraudulent packets from being received from an intruder and acted upon.

There is thus a need for a system and method that provides a robust redundancy mechanism for providing failover among Layer 2 and Layer 2/Layer 3 devices that improves on the shortcomings of presently available solutions.

BRIEF SUMMARY OF THE INVENTION

In accordance with the present invention, systems and methods are described for providing route redundancy to Layer 2 networks. The L2 network may have a plurality of switches arranged in an arbitrary configuration or architecture, but must remain loop free through the use, for example, of spanning tree or other protocol. Redundancy is provided through use of a virtual switch identified by an address and having two or more Layer 2 switches which communicate with one another to elect a master at any given time.

Thus, in accordance with one embodiment, a system is provided including a loop free Layer 2 network having a plurality of switching devices. A virtual switch is coupled to the loop free Layer 2 network, the virtual switch having two or more switches configured to transition between master and backup modes to provide redundant support for the loop free Layer 2 network, the switches communicating their status through use of a plurality of redundancy control packets. The system also includes means for allowing the redundancy control packets to be flooded through the Layer 2 network. The means may include time-to-live data attached to the redundancy control packet which is decremented only when the packets are transferred through devices which are configured to recognize the protocol used in redundancy control packets.

In accordance with another aspect of the invention, a method is described for providing redundancy to a loop free Layer 2 network of arbitrary configuration. The method involves coupling a virtual switch to the Layer 2 network, the virtual switch comprising two or more switches configured to transition between master and backup modes to provide redundant support for the Layer 2 network. One or more of the switches in the virtual switch transmit redundancy control packets, the redundancy control packets including time-to-live data. The redundancy control packets are flooded through the Layer 2 network and the time-to-live for the packets is decremented only when the redundancy control packet is transferred through a device configured to interpret the redundancy control packet.

In accordance with another aspect, the invention includes a computer usable medium storing program code which, when executed, causes a computerized Layer 2 switch to perform a method for transitioning between backup and master roles in a virtual switch. The method performed by the program includes storing a priority value for the switch and transitioning the switch device to a backup mode if a redundancy control packet is received by the switch where the embedded priority value of the packet is greater than the stored switch priority value. The method further includes transitioning the switch device from the backup mode to a master confirm mode if a redundancy control packet is received by the switch where the embedded priority value of the packet is less than the stored switch priority value. When in master confirm mode, the switch transmits a plurality of redundancy control packets until the switch is transitioned to the backup mode, and transitions from the master confirm mode to a master mode if the number of transmitted redundancy control packets reaches a threshold.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Embodiments of a method, system, and article of manufacture comprising software programs for providing network route redundancy across Layer 2 (L2) and hybrid Layer 2/Layer 3 (L2/L3) devices in accordance with the present invention are described with reference to the drawings in FIGS. 1 through 15.

Figure 1:
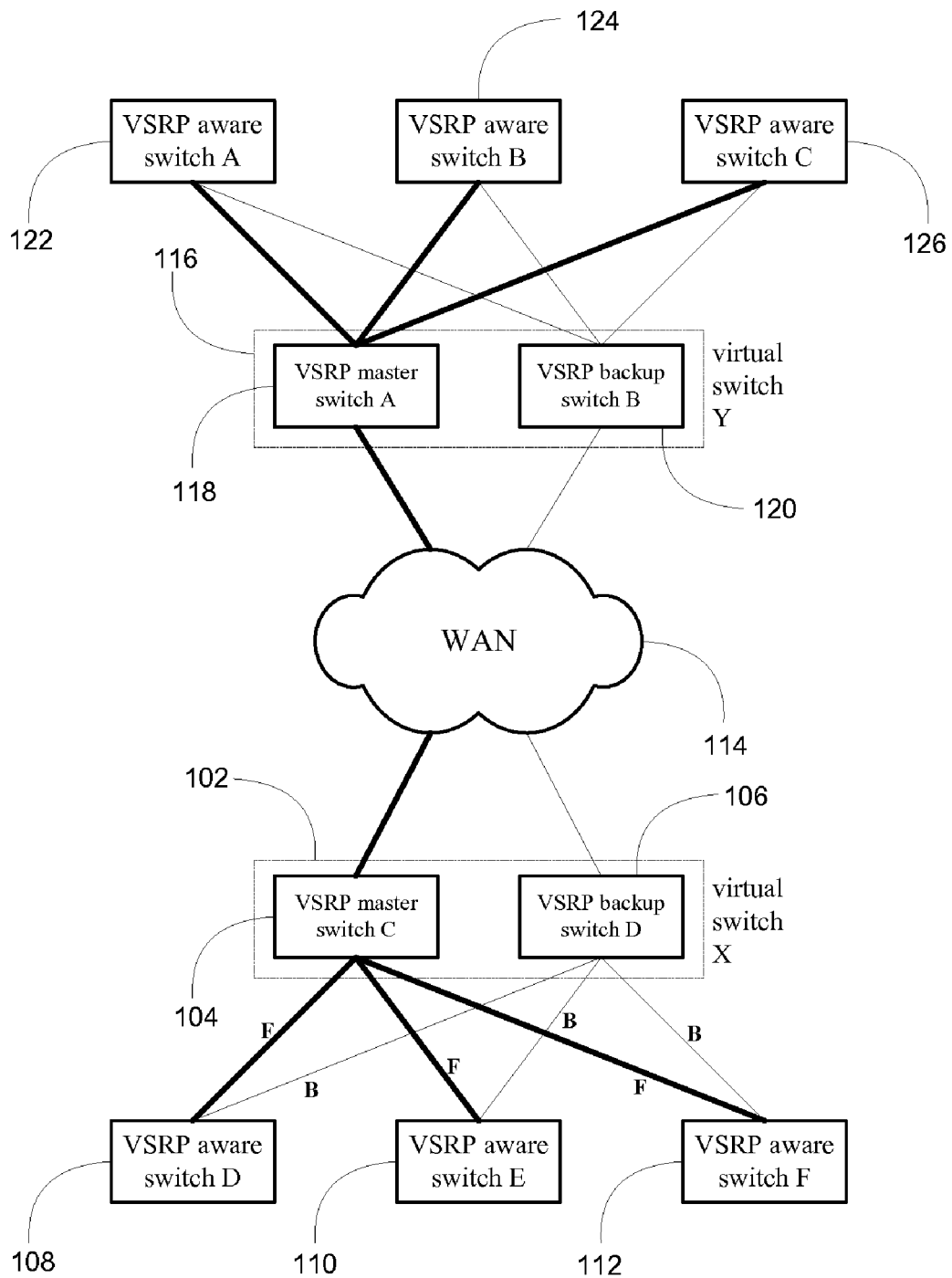
FIG. 1 is a block diagram presenting a configuration of VSRP and VSRP aware devices according to one embodiment of the present invention.

Turning to FIG. 1, a network topology configured according to one embodiment of the present invention is illustrated. The network topology presented comprises a number of switches 108, 110, 112, 122, 124, 126 performing Layer 2 aggregation and switching functionality. As is explained in greater detail herein, each of these Layer 2 devices 108, 110, 112, 122, 124, 126 is aware of the Virtual Switch Redundancy Protocol or VSRP, described in detail herein, and may thus properly operate with the failover functionality provided by the present invention. An exemplary Layer 2 device 108, 110, 112, 122, 124, 126 is the Edgelron 4802F switch available from Foundry Networks of San Jose, Calif.

In accordance with the invention, each of these Layer 2 devices 108, 110, 112, 122, 124, 126 may also be connected to one or more host devices, hubs, switches, bridges or other network interconnection devices. Indeed, these L2 switches may be connected to any arbitrary Layer 2 network topology which is loop free. For example, these switches may be connected to a network running the spanning tree protocol to eliminate loops. As another example, the connected network may be a ring running the simplified loop prevention protocol described in commonly-owned patent application Ser. No. 10/090,669, filed Mar. 4, 2002, now U.S. Pat. No. 6,717,922, entitled "NETWORK CONFIGURATION PROTOCOL AND METHOD FOR RAPID TRAFFIC RECOVERY AND LOOP AVOIDANCE IN RING TOPOLOGIES", said application being incorporated herein by reference. In either case, VSRP may be employed with the other protocol using techniques described herein.

In the network topology illustrated at FIG. 1, another layer of devices 104, 106, 118, 120 reside between the VSRP aware devices performing L2 aggregation and switching 108, 110, 112, 122, 124, 126 and the network core 114. Each of these devices 104, 106, 118, 120 comprises L2 switching functionality and preferably L3 functionality as well. These devices are described as VSRP devices because they communicate with other VSRP devices according to the Virtual Switch Redundancy Protocol (VSRP), as is explained in greater detail herein. VSRP devices 104 and 118 are also associated with other VSRP devices, 106 and 120 respectively, in order to create virtual switches 102 and 116, respectively, that operate according to the VSRP protocol.

Looking at the topology connected to the "southern" region of the WAN, the virtual switch 102 is connected to each VSRP aware device 108, 110, 112 residing directly below the virtual switch 102 in the topology. Specifically, only one of the VSRP devices 104 comprising the virtual switch 102 is in active communication with the VSRP aware devices 108, 110, 112 to which it is connected. These interconnections are presented in bold typeface both here and throughout the disclosure of the present invention as indicative of a connection over which normal network traffic is being passed, e.g., ports on both ends of the connection 104 and 108 are forwarding data. This is in contrast to the interconnections presented in normal typeface where traffic is being blocked. As is explained herein, not all traffic is blocked over ports set to block traffic according to the protocol of the present invention.

Figure 2:
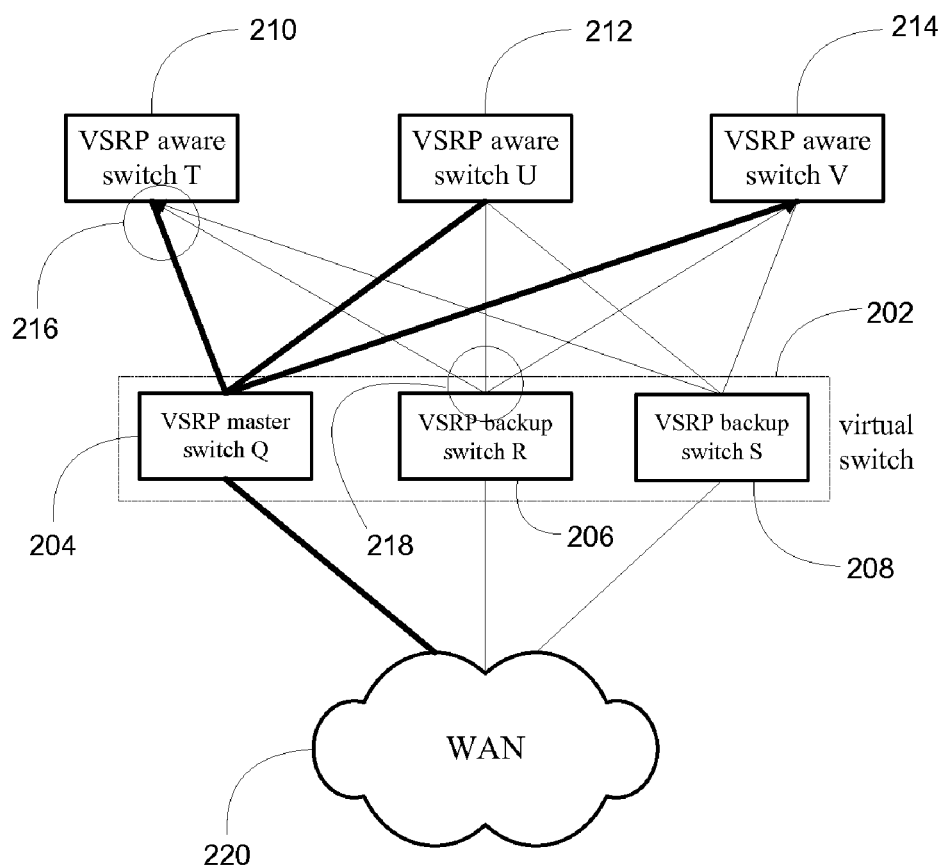
FIG. 2 is a block diagram presenting a configuration of VSRP and VSRP aware devices according to another embodiment of the present invention.

Building on the general network topology of the invention presented in FIG. 1, FIG. 2 presents an alternative embodiment of a configuration of VSRP and VSRP aware devices. As in the previous illustration, several VSRP aware switches are presented 210, 212, and 214. These switches 210, 212, 214 are VSRP aware and are provided with knowledge that they connect a plurality of devices acting in concert as one virtual switch. Although it may be assumed that additional network infrastructure resides below this level of devices 210, 212, 214, e.g., hosts and other network interconnect devices, it is by no means a requirement of the present invention.

Sitting between the VSRP aware switches 210, 212, and 214 and the network core 220 are a series of VSRP switches 204, 206 and 208. As is explained herein, each of the VSRP switches 204, 206 and 208 communicates with other VSRP switches according to the VSRP protocol. Communication according to the protocol allows devices in a virtual switch to determine whether it should set itself to master mode, backup mode, or an intermediary mode described below, for the group of supported devices, thereby providing failure redundancy and avoiding network loops. The VSRP switches 204, 206 and 208 are configured as one virtual switch 202, providing redundant routes to the network core 220 in the event that the current VSRP master switch 204 within the virtual switch 202 becomes inoperative, e.g., not the optimal switch to be acting as master for a given virtual circuit 202.

Specific attention is directed to the symmetrical manner in which the VSRP switches 204, 206 and 208 comprising the virtual switch 202 are connected to the VSRP aware switches 210, 212, 214 for which the virtual switch 202 is providing redundancy. For example, VSRP aware switch T 210 is symmetrically connected to VSRP master switch Q 204, VSRP backup switch R 206 and VSRP backup switch S 208, all three of which comprise the virtual switch 202. Among the three connections 216, the only connection forwarding data is the connection with VSRP master switch Q 204, whereas backup switches R and S, 206 and 208 respectively, are blocking communication. In this manner, only one switch 204 in the virtual switch 202 is transmitting data, while the other switches 206 and 208 are blocking traffic until the situation arises when one of the two is required to become the master switch, causing the current master switch 204 to transition to backup mode. It should also be noted that, in addition to the VSRP aware switches 210, 212, 214 being symmetrically connected to the virtual switch 202, it is axiomatic that each VSRP switch 204, 206, 208 must in turn be symmetrically connected to each VSRP aware switch 210, 212, 214 that the virtual switch 202 is providing redundancy for. This is true regardless of whether the VSRP device is in master or backup mode.

Figure 3:
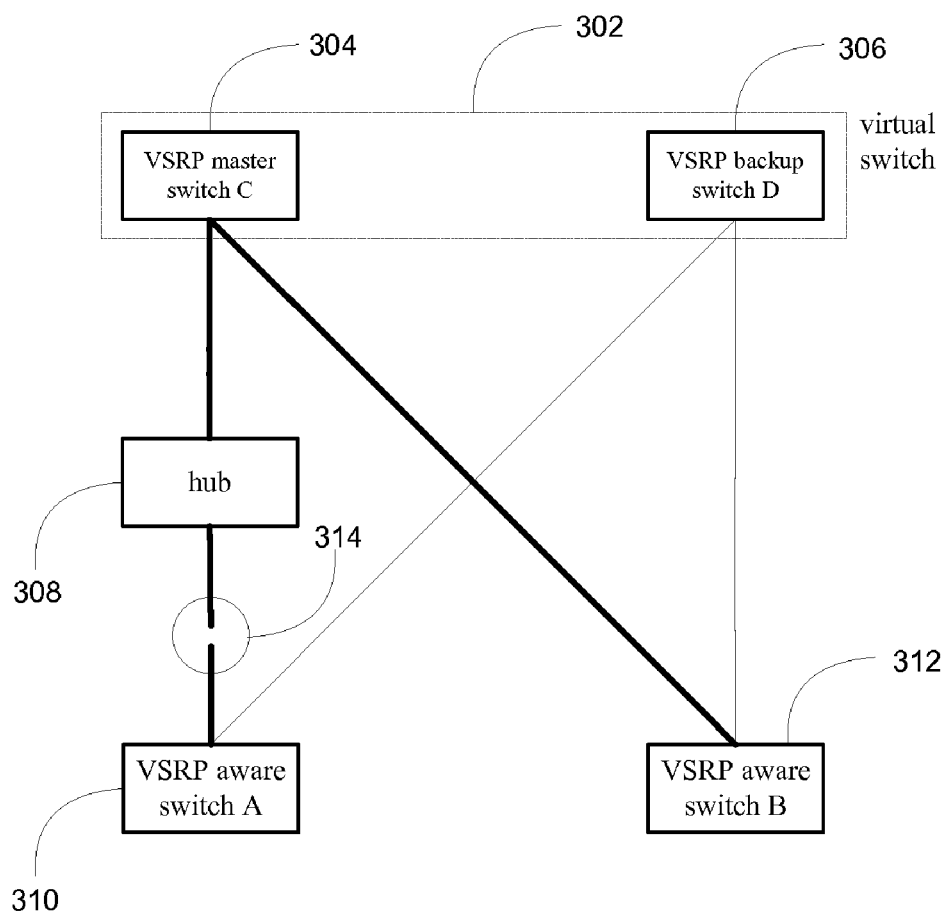
FIG. 3 is a block diagram presenting a break between a master VSRP device and a VSRP aware device according to one embodiment of the present invention.

As is explained in greater detail herein, a priority value determines whether a VSRP device is in master or backup mode. One of the factors in determining priority value is the number of connections the VSRP device has vis-à-vis other VSRP devices comprising the same virtual switch. FIG. 3 presets a situation where the VSRP device currently in master mode 304 has lost communication 314 with a VSRP aware switch 310 located on the far side of an intermediate hub 308, which is an unmanaged device. According to the present invention, detailed knowledge of the overall network is not required, only knowledge that the VSRP aware switches being backed up are symmetrically connected to the VSRP switches comprising the virtual switch. Knowledge at each VSRP switch comprising the virtual switch that a "live" connection exists to every immediate supported neighbor (here, a VSRP aware switch) is necessary in order to provide failover when an outage occurs.

In order to determine the number of connections each VSRP switch 304 and 306 has to VSRP aware switches 310 and 312, it is necessary to do more than simply count the ports that are connected at the VSRP switch 304 and 306. Knowledge of a physical connection at a particular port on a VSRP switch 304 and 306, regardless of the connection status, is not helpful in determining a switch's ability to connect to the virtual switch's neighbors. Therefore, in order to determine the number of "live" connections, each VSRP switch 304 and 306 broadcasts L2 health check packets, independent of the VSRP hello packets discussed elsewhere herein. The Layer 2 heath check is essentially a query broadcast by the VSRP device 304 and 306 on all of its interfaces. These health check packets are exchanged, for example, between either end of links 304-310 and 304-312. Each L2 device, e.g., VSRP aware switches 310 and 312, that receives the Layer 2 heath check packet broadcast by the VSRP switch 304 and 310 respond with a response packet identifying the device. According to some techniques, extended device data is returned. Software executing on the VSRP router is used to advertise aggregated L2 connection information, along with additional data, to other VSRP routers comprising the same virtual switch in order to make election decisions.

In the situation presented in FIG. 3, the physical link between the VSRP master switch 304 and the hub 308 is still up. The connection between the hub 308 and the underlying VSRP aware switch 310, however, has been severed 314. As is clearly explained herein, this should result in a failover unless, for example, no other device has more connections to the virtual switch's neighbors or no other device has a high quality connection to the network core (not pictured) than the current VSRP master switch. Essentially, a failover occurs here unless there is not another device comprising the virtual switch capable of providing better L2 service between the VSRP devices and the network core. The L2 health check performed here by the VSRP switches 304 and 306 results in VSRP switch D 306 recording that it has two live connections, while VSRP switch C, the current master switch for the virtual switch 302, announces only one connection. This information is then taken into account as parameters in the election process performed at each VSRP device comprising a virtual switch to determine if another device should transition into master mode with the current master transitioning into backup mode and blocking ports that are currently forwarding. In particular, in some embodiments the number of live connections determined through the use of health check packets is a factor in determining the priority assigned to the respective switch, which priority is then inserted into the VSRP hello packets as discussed herein.

Figure 4:
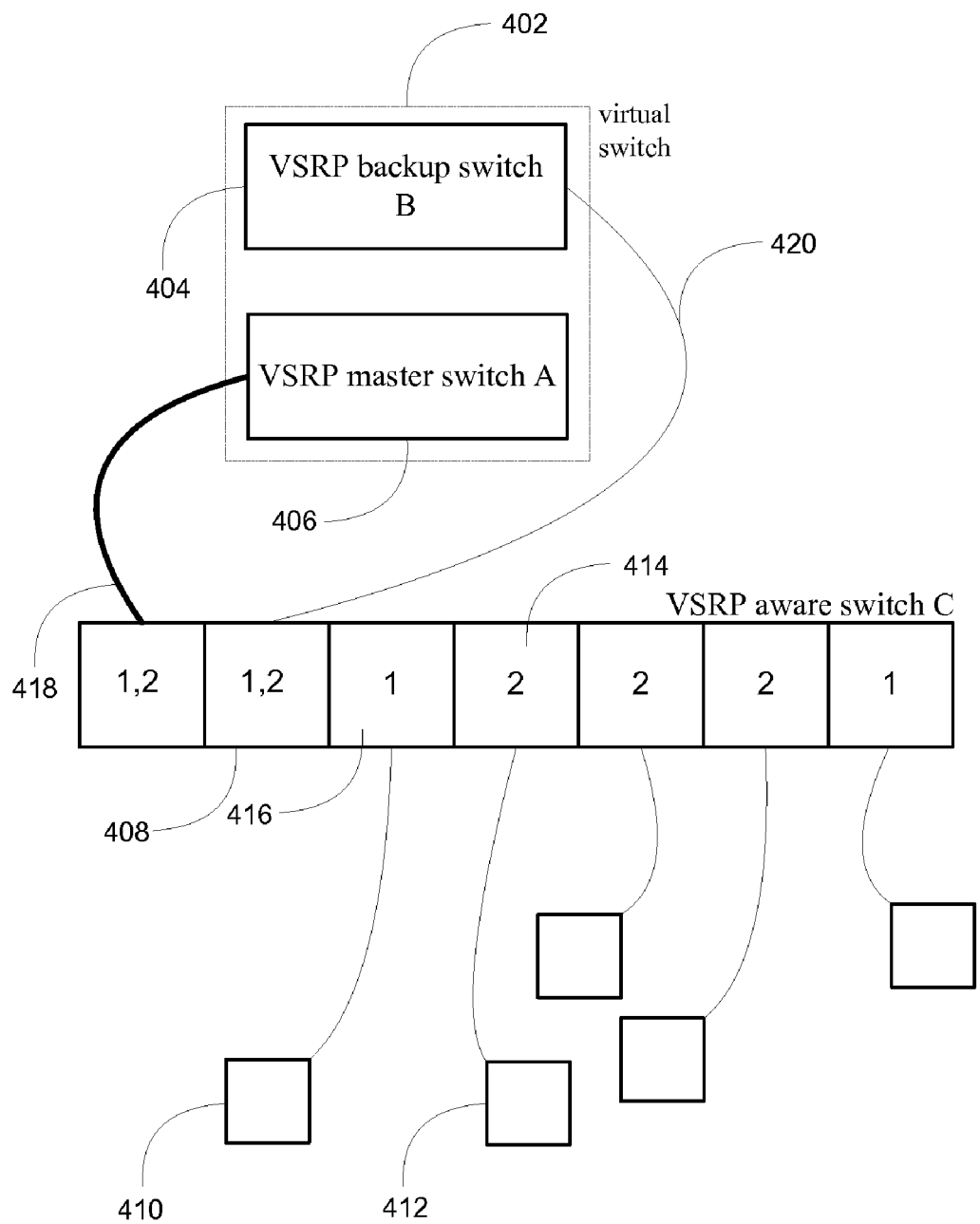
FIG. 4 is a block diagram presenting a VSRP aware device utilizing multiple VLANs connected to master and backup VSRP devices according to one embodiment of the present invention.

As discussed above, a virtual LAN (VLAN) can be viewed as a group of devices on different physical LAN segments which can communicate with each other as if they were all on the same physical LAN segment. FIG. 4 presents an embodiment of the invention where a VSRP aware switch 408 assigns individual ports on the switch membership in different VLANs 414 and 416. By configuring the VSRP aware switch 408 so as to have different ports assigned to membership in different VLANs 414 and 416, an administrator may use multiple switches to mimic the effect of having one physical segment. Also provided is a virtual switch 402 supplying the VSRP aware switch 408 with a communications path to other segments of the network (not pictured). The virtual switch 402 comprises two VSRP switches 404 and 406. Functionality is provided at the VSRP switch 404 and 406 so that traffic destined for either of the VLANs on the VSRP aware switch 408 is forwarded by the VSRP master switch 406 over the forwarding link 418. The link between the VSRP aware switch 408 and the VSRP backup switch 404 is set to blocking 420 so as to prevent a network loop, until such time as the VSRP backup switch is required to transition into master mode.

Each host, e.g., 410, 412, etc., that is connected to the VSRP aware physical LAN segment 408 is assigned membership in a specific virtual LAN, e.g., 416. In this manner, traffic received by the switch 408 is not broadcast to all physically connected hosts 410 and 412. Using a command line interface (CLI) to access and set parameters used by software at the VSRP switch in providing redundancy, an administrator may set a virtual switch 402 to provide redundancy for only selected VLANs 414 and 416 on a VSRP aware switch 408. Alternatively, software in the VSRP switch allows an administrator to create a topology group whereby one VLAN is set as the master VLAN for the group. The topology group is also bound to or associated with one or more additional VLANs. This binding of master and member VLANs is required due to the fact that each physical interface on a switch may only be associated with an individual VLAN. Software in the VSRP switch is configured to catch and respond to traffic destined for the master and member VLANs, thereby providing failover protection for the topology group.

For example, the topology presented in FIG. 4 satisfies the requirement that the connections 418 and 420 between the VSRP aware switch 408 and the virtual switch 402 are symmetrical. An administrator may set the virtual switch 402 to provide redundancy for only VLAN 1 (416). Assuming that scenario, the VSRP switches 404 and 406 are configured to broadcast traffic on only VLAN 1 (416), thereby requiring an additional communications path (not pictured) to broadcast traffic destined for VLAN 2 (414). Alternatively, as presented in the current illustration, an administrator creates a new topology group setting VLAN 1 as the master VLAN and binding VLAN 2 as a member VLAN. The election process of the present invention is executed by software in each VSRP switch 404 and 406 comprising the connected virtual switch 402 to determine the VSRP switch it should set itself to master or backup mode. The VSRP master switch forwards traffic for all members of the topology group until such time as the VSRP master switch is required to transition into backup mode.

Figure 5:
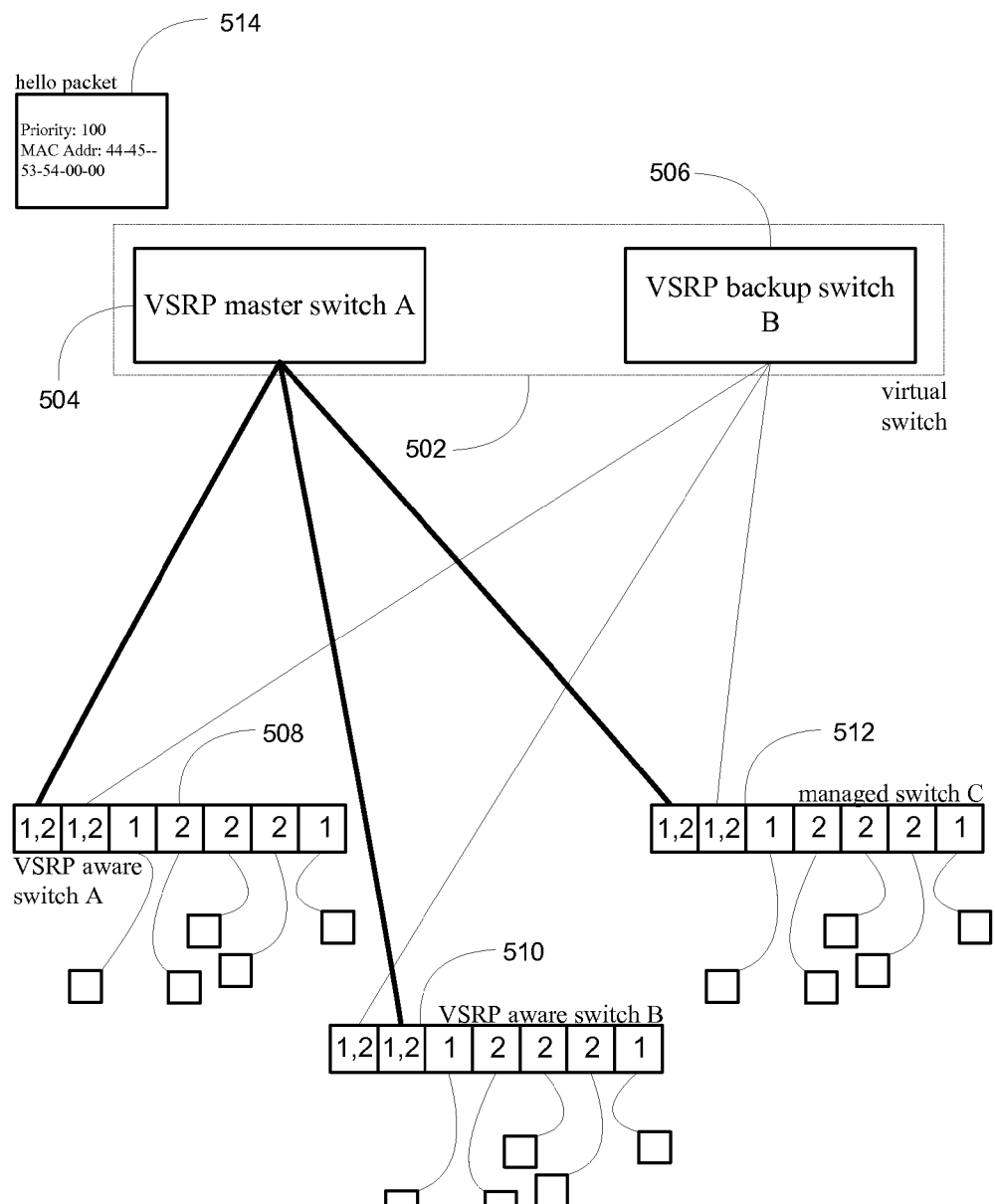
FIG. 5 is a block diagram presenting multiple VSRP aware devices, each utilizing multiple VLANs, connected to a virtual switch according to one embodiment of the present invention.

FIG. 5 builds on the embodiment of the system presented in FIG. 4. Presented in this illustration are three VSRP aware switches 508, 510 and 512. Each of the VSRP aware switches presented here 508, 510 and 512 has partitioned its ports between two VLANs: VLAN 1 and VLAN 2, so at to thereby mimic two physical network segments. Traffic received on each of the VSRP aware switches 508, 510 and 512 is not broadcast to every host physically connected to the switch according to this configuration. Instead, traffic is tagged as destined for a particular VLAN, with the VSRP aware switch broadcasting packets only to ports that are members of the target VLAN. Hosts attached to different physical LAN segments, therefore, appear as one logical LAN.

A virtual switch 502 provides a redundant connection to an outside network or network segments for the VSRP aware switches 508, 510 and 512. The virtual switch 502 is comprised of two VSRP switches: a VSRP master switch 504 and VSRP backup switch 506. It should be noted that additional VSRP switches may be added to the virtual switch 502 in order to provide additional failover capacity. In a virtual switch according to the present invention that has reached a stable configuration, the VSRP switch acting as the VSRP master switch 504 for the virtual switch 502 sets all its ports to forward data, represented by bold lines interconnecting the VSRP master switch 504 with the VSRP aware switches 508, 510, 512. All other VSRP switches in the stable virtual switch transition to backup mode and set their ports to block all traffic except for hello messages from other VSRP switches in the virtual switch. Furthermore, the virtual switch 502 is configured to provide failover protection for both of the VLANs on the VSRP aware switches 508, 510, and 512 by binding the two VLANs into a single topology group. Binding of VLANs into topology groups is accomplished through programming at the VSRP switch's command line interface.

As explained throughout the disclosure, the present invention is concerned with providing redundancy protection for Layer 2 devices in large switched networks, as well as preventing problematic network loops whereby hosts appear on multiple interfaces of the same device. The invention accomplishes these objectives by associating two or more VSRP switches into a virtual switch, thereby providing redundancy protection, and setting only the ports of one VSRP switch to forward and the rest to block. A hello packet 514 is used by each VSRP backup switch 506 to determine, based on the status of received hello packets in the same virtual switch 502, whether it should be in master mode (ports forwarding), blocking mode (ports blocking), or an intermediary "master confirm" mode (ports blocking to traffic but transmitting hello packets).

Each hello packet 514 transmitted by the VSRP switch in master mode comprises data that indicates the transmitting VSRP switch's state, which is determined on the basis of a number of factors. Of high importance is the priority value, which among other factors is based on the number of connections that the VSRP switch has to the virtual switch's neighbors, e.g., the switches for which redundancy is being provided. As with other topologies configured according to the present invention, the VSRP switches 504 and 506 are symmetrically connected to the supported VSRP aware switches 508, 510, and 512. The VSRP switches 504 and 506 may also export this priority data for utilization with other software applications that monitor and respond to network health issues, such as the IronView switch and INM product available from Foundry Networks.

In addition to the number of connections that a VSRP switch has to the virtual switch's neighbors, the priority data comprising the hello packet 514 is based on the relative quality of the VSRP switch's connection to the outside network or network segments. The VSRP switch uses a tracking value, defined in the switch, to modify the priority value with regard to the fluctuating quality of its connection to the outside network. In addition to the priority value, other data may be broadcast as part of the hello packet, such as the VSRP switch's MAC address, IP address, and other miscellaneous data that may be used by software executing on other switches in the virtual switch 502 to deduce whether to transition into master or backup mode.

Once the virtual switch has reached a stable configuration, the VSRP master switch sets its ports to forwarding and continues to send out hello packets. VSRP backup switches set their ports to blocking and receive hello packets to determine if they should remain in backup mode or transition to master mode; hello packets are permitted transmission over blocked ports on the VSRP backup switch 506. The connected VSRP aware switches 508, 510 and 512 receive the hello packets 514 and 516. Each VSRP aware switch 508, 510 and 512, floods the hello packet upon receipt, which is received by other VSRP switches 504 and 506 in the virtual switch 502 due to the symmetrical nature of the connection topology. As understood by those skilled in the art, flooding generally occurs when a packet is forwarded to all devices other than the device from which it was received, and is generally performed when the packet has no routing address.

Alternatively, a direct link may be provided between VSRP devices 504 and 506 as a primary channel for transmission of hello packets to reduce extraneous administrative traffic on the network; a flooding technique may be used regardless of the primary link or only in the event the primary link fails. The primary link improves the efficiency of and synchronicity between the VSRP configured or aware switches, because the direct/primary link ensures the timely delivery of hello packets.

Because the VSRP packets are transmitted through flooding, a control mechanism is used to prevent overflooding. Thus, in some embodiments a time-to-live (TTL) packet is attached to the VSRP hello packet, which TTL is decremented each time the packet is transferred through a VSRP switch. Thus, for example, if the VSRP aware switches are arranged in a multiple layer topology, such as a ladder topology (in which each pair of a series of VSRP backup switches is connected to another pair of VSRP backup switches in symmetrical fashion), the TTL is set so that it counts down to zero when the hello packet reaches the intended VSRP backup switch(es) in the ladder topology, thus stopping the hello packet from continuing to circulate. However, when VSRP hello packets are flooded through other topologies to which the VSRP aware switches are connected, the TTL should not be decremented so as to prevent the packet from timing down to zero before it reaches the other VSRP aware devices. For example, the VSRP aware switches may, in accordance with the invention, be connected to a Layer 2 network with arbitrary, albeit loop free, configuration, which network is running another protocol to prevent loops and provide redundancy. One such exemplary configuration is a linear topology, such as a ring configuration described below.

Any devices in the connected network not running VSRP do not decrement the VSRP packet TTL.

Thus, in accordance with embodiments of the invention, a default TTL value is provided in the hello packet generation software executing in the VSRP switches. Network administrators, aware of the network topologies connected to the VSRP switches, may set or change the TTL value through a command line interface with the switches.

Figure 6:
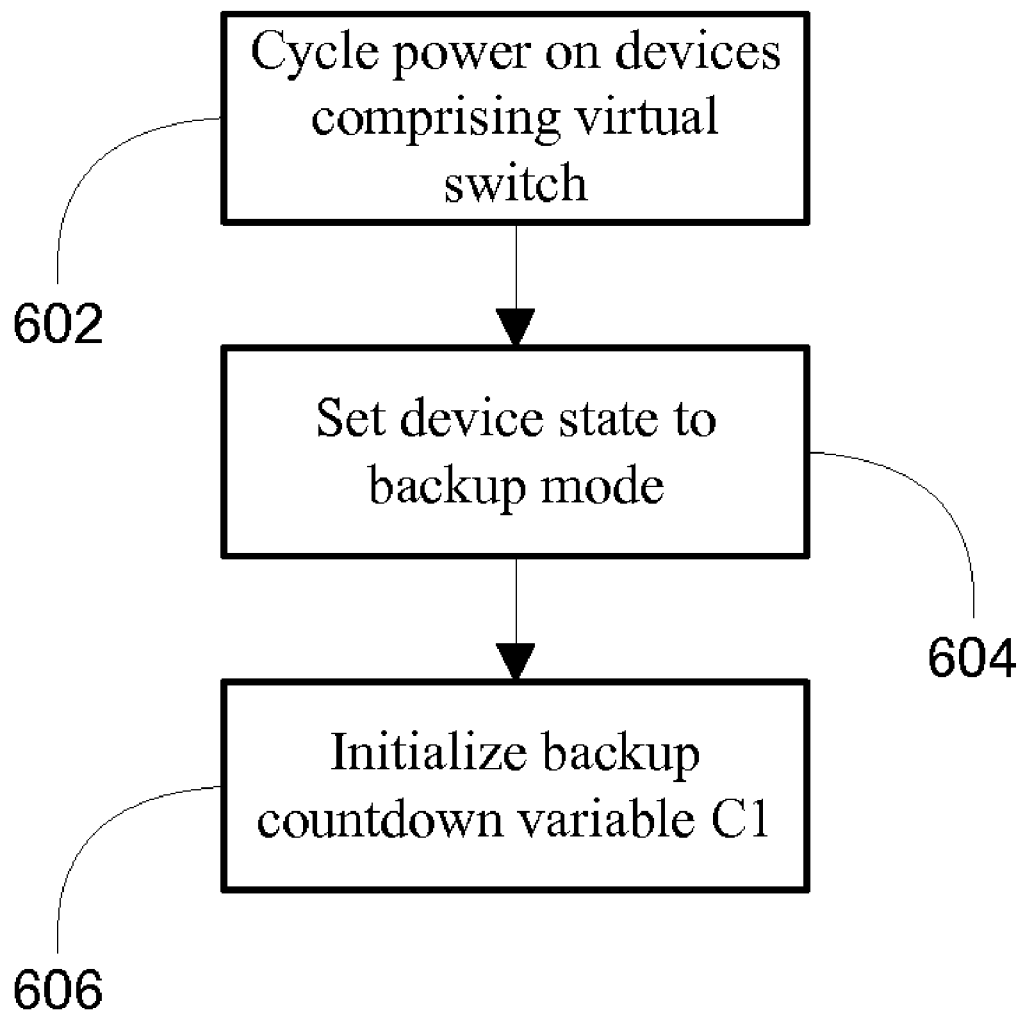
FIG. 6 is a flow diagram pressing a process for initializing a VSRP device within a virtual switch according to one embodiment of the present invention.

FIGS. 6 through 10 present processes for implementing and operating a virtual switch as presented in FIGS. 1 through 5. Turning to FIG. 6, the process executed by software executing on the VSRP switch typically begins by cycling the power on or resetting all devices comprising the virtual switch, step 602. As will be evident by processes presented at a later point in the program execution, the current part of the process is typically only executed when the virtual switch is initialized. Upon power being cycled on, each of the VSRP switches comprising the virtual switch transitions to backup mode, step 604. One skilled in the art, however, will appreciate that this is not a requirement of the invention and the process may be adapted with little effort to accommodate the VSRP switches transitioning to master mode when powered on. Each VSRP switch in the virtual switch further initializes a countdown variable, referred to as C1, step 606.

Figure 7:
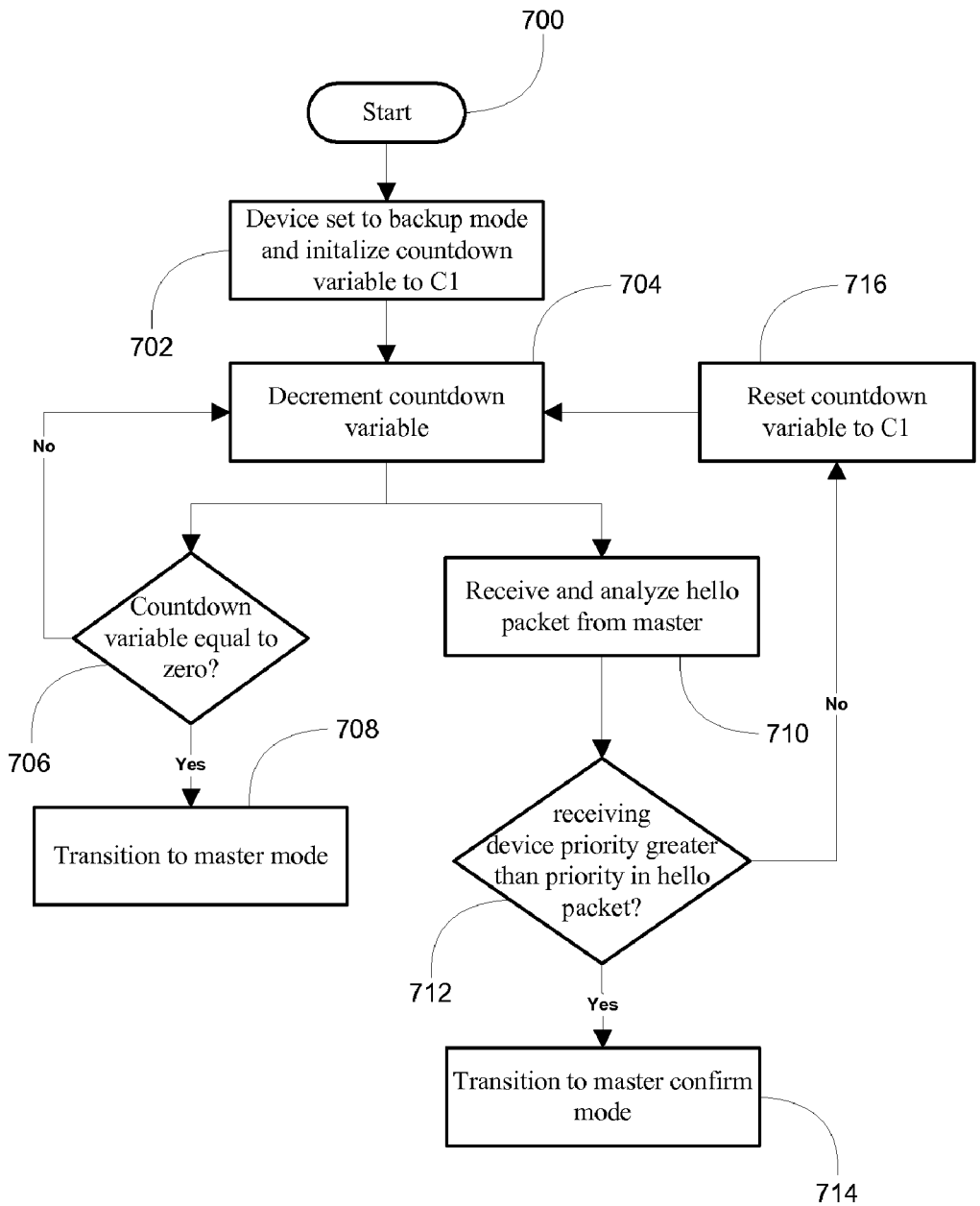
FIG. 7 is a flow diagram presenting a process that a VSRP device executes during operation in backup mode according to one embodiment of the present invention.

Each VSRP switch in backup mode executes the process illustrated in FIG. 7 to determine if a transition to a new mode is required based on its own state versus the state of other VSRP switches in the virtual switch. The process begins 700 with the VSRP switch set to backup mode, step 702. As described above, a VSRP switch in backup mode sets all of its port to a blocking state whereby only hello packets are accepted over the port; regular network traffic is denied. The VSRP switch also initializes a countdown variable to the value C1, step 702. The countdown variable is used by the VSRP switch when in backup mode to determine if no other device in the same virtual switch is in master mode and transmitting hello packets, thereby indicating that the switch in backup mode should transition to master mode. According to embodiments of the invention, a switch administrator uses the VSRP switch's command line interface to define the initial value of the countdown variable. Furthermore, each VSRP switch within a given virtual switch may initialize the countdown variable to a different value if desired.

The device is initialized, step 702, and the VSRP switch decrements the countdown variable, step 704. The VSRP switch in backup mode executes two processes in parallel in order to determine its proper mode. After the switch decrements the countdown variable, step 704, a check is performed to determine if the countdown variable is equal to zero, step 706. If the countdown variable is not set to zero, step 706, control returns to step 704 where the VSRP switch once again decrements the countdown variable. Where the countdown variable is equal to zero, step 706, the time threshold to receive hello packets from a device or devices in master mode has been exceeded, thereby causing program flow to pass to step 708 where VSRP switch transitions from backup mode to master confirm mode. The transition is performed where no hello packets have been received in the countdown window due to the fact that this condition is indicative of no other device comprising the virtual switch being in master confirm mode.

Executing in parallel with the countdown process, steps 706 and 708, another process awaits receipt of one or more hello packets from the device or devices attempting to act as the VSRP master switch for the virtual switch, steps 710, 712, 714, and 716. Where no hello packet is received, the process waits while the previously described parallel process, steps 704, 706, and 708, continues to decrement the countdown variable. Where a hello packet is received from a device in master mode, step 710, it is analyzed to retrieve the data values contained therein, e.g., priority value for the VSRP switch that is transmitting the packet. The VSRP switch extracts the priority value and performs a check to determine whether it has a higher priority value than the priority value contained in the received hello packet, step 712.

Where the receiving VSRP switch determines that the priority value contained in the received hello packet is greater than its priority value, step 712, the VSRP switch concludes that it should remain in backup mode as another device is properly acting as the master VSRP switch for the virtual switch. The VSRP switch reinitializes the countdown variable to C1, step 716 and program flow returns to step 704 where the process is repeated. If, however, the VSRP switch determines that its priority value is greater than that contained in the received hello packet, the VSRP switch concludes it should potentially be the master VSRP switch. In order to "challenge" the current VSRP master, the VSRP switch transitions into an intermediate mode between backup and master mode referred to as master confirm mode, step 714. The parallel process run by the software to maintain the timer mechanism, steps 706 and 708, is killed when the VSRP switch transitions to master confirm mode.

Figure 8:
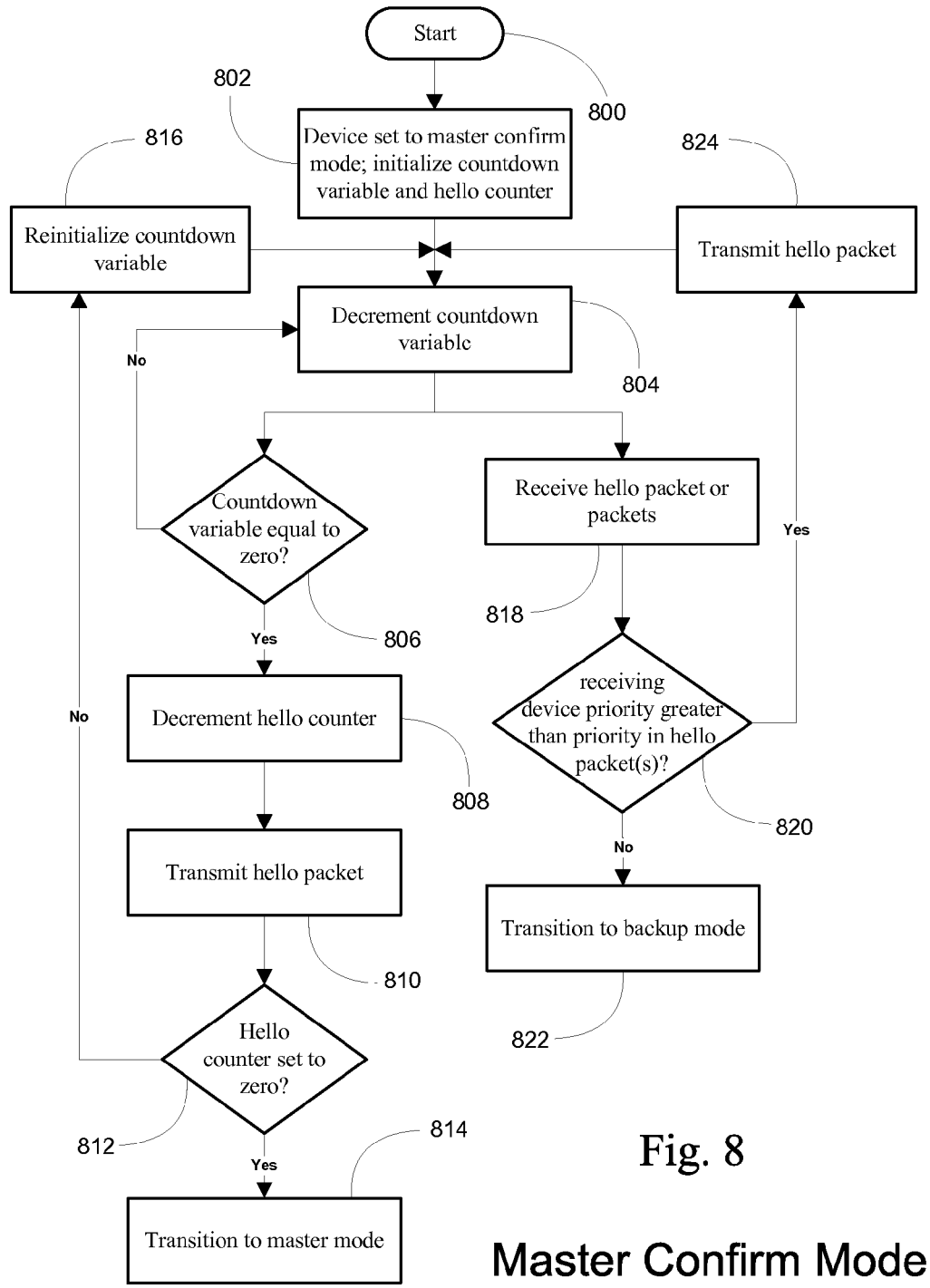
FIG. 8 is a flow diagram presenting a process that a VSRP device executes during operation in master confirm mode according to one embodiment of the present invention.

The process executed by the VSRP switch upon entering master confirm mode is introduced in FIG. 8. The process begins, step 800, when the device transitions into master confirm mode, at which point the VSRP software initializes a countdown variable and a hello counter, step 802. The countdown variable is used as a timer to trigger the transmission of hello packets. The hello counter is maintained to set a threshold number of hello packets to transmit, at which point the VSRP switch transitions into master mode if it hasn't already transitioned to backup mode and thus terminated sending hello packets. The counters are initialized, step 802, and the software executing at the VSRP switch decrements the countdown variable, step 804. As is the case with the processes performed by the VSRP switch in backup mode, the processes performed by the switch in master confirm mode are similarly executed in parallel. For convenience, the timer process is explained first, steps 806, 808, 810, 812, 814, and 816, followed by an explanation of the packet comparison process, steps 818, 820, 822, and 824.

When the software decrements the countdown variable, step 804, a check is performed to determine if the countdown variable is equal to zero, step 806. Where the countdown variable is not equal to zero, step 806, the process once again decrements the countdown variable, step 804, and so forth until the variable is equal to zero, step 806. When the countdown variable reaches zero, step 806, the software decrements the hello counter variable, step 808. The VSRP switch transmits hello packets indicating its current priority on all of its ports that are not outgoing ports connected to an outside network, step 810. The hello packets are transmitted, step 810, and a check is performed to determine if the hello counter is set to zero. Where the hello counter has not been set to zero, the software resets the countdown variable, step 806, and program flow for this portion of the parallel process returns to step 804. If the hello counter has expired and the VSRP switch is still in master confirm mode, the software operating at the VSRP switch concludes that it should be the VSRP master switch and transitions into master mode.

Figure 9:
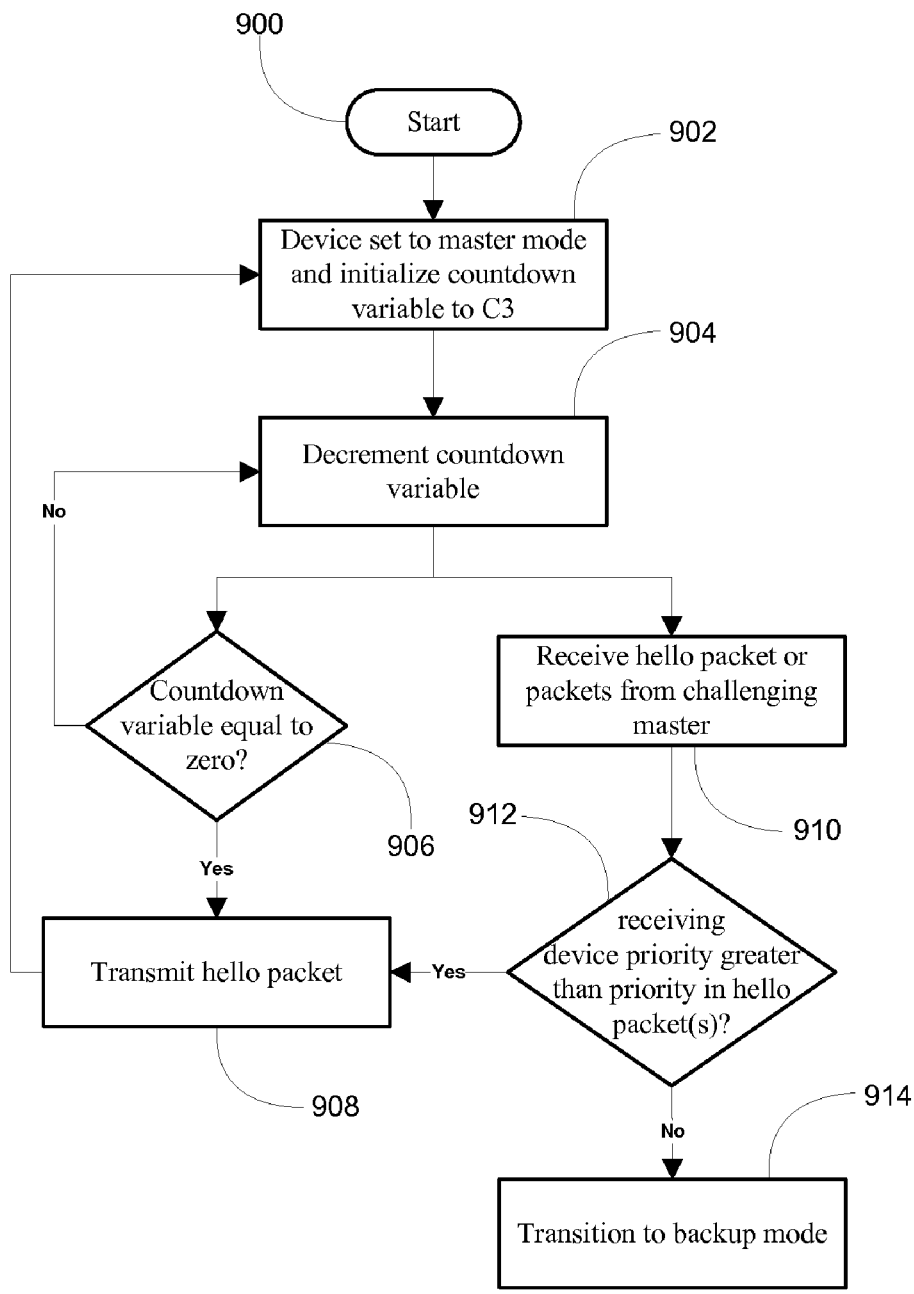
FIG. 9 is a flow diagram presenting a process that a VSRP device executes during operation in master mode according to one embodiment of the present invention.

Executing in parallel with the countdown process, steps 806, 808, 810, 812, 814 and 816, a process awaits receipt of one or more hello packets from the device or devices attempting to act as the VSRP master switch for the virtual switch, steps 710, 712, 714, and 716. Where no hello packet is received, the process waits while the previously described parallel countdown process, steps 806, 808, 810, 812, 814 and 816, continues to decrement the countdown variable, hello counter, and transmit hello packets as is appropriate.

Where a hello packet is received from a device in master mode or master confirm mode, step 818, it is analyzed to determine the data values contained therein, e.g., priority value for the VSRP switch that is transmitting the packet. Because multiple devices may simultaneously be in master confirm mode, the VSRP switch may receive one or more hello packets, step 818. The number of potential hello packets is also a function of the number of devices comprising the virtual switch. The VSRP switch receives the hello packet or packets and performs a check to determine whether its priority is greater than that contained in any of the hello packet or packets, step 820.

Where the VSRP switch calculates that it has a higher priority than that contained in any analyzed hello packet, step 820, a hello packet is transmitted containing the VSRP switch's priority value and this portion of the parallel process concludes until the next hello packet is received, step 818. If, however, the VSRP switch calculates that the received hello packet contains a greater priority value, the VSRP concludes that another device is the proper VSRP master for the virtual switch and therefore transitions into backup mode and sets its ports to blocking, step 822. The parallel process run by the software to maintain the timer mechanism, steps 806, 808, 810, 812, 814 and 816, is killed when the VSRP switch transitions to backup mode. According to embodiments of the invention, the switch's ports remain blocked when in master confirm mode so as to prevent temporary network loops.

Where the VSRP switch in master confirm mode transmits the number of hello packets as defined by the hello counter variable, step 812, and no other device is broadcasting a higher priority value, step 820, the VSRP switch concludes it should be the VSRP master and transitions to master mode. Consistent with performance of the VSRP switch in master mode, the VSRP switch sets all its ports from blocking to forwarding, thereby allowing the regular flow of network traffic over its ports. The process executed by the VSRP switch in master mode is illustrated in FIG. 9. The process begins, step 900, when the device transitions into master mode, at which point the VSRP software initializes a countdown variable, step 902. The countdown variable is used as a timer to trigger the transmission of hello packets in the event the VSRP fails to receive hello packets from another device in the virtual switch.

The counters are initialized, step 902, and the software executing at the VSRP switch decrements the countdown variable, step 904. As is the case with the processes performed by the VSRP switch when in backup and master confirm modes, the processes performed by the switch in master mode are similarly executed in parallel. In one portion or thread of the parallel process, a check is performed to determine if the countdown variable is set to zero, step 906. Where the countdown variable is not equal to zero, step 906, the process once again decrements the countdown variable, step 904, and so forth until the variable is equal to zero, step 906. When the countdown variable reaches zero, the VSRP switch transmits hello packets over its ports connect to the managed VSRP aware switches, step 908. The hello packets are transmitted, step 908, and the countdown variable is reinitialized, step 902.

A parallel process for performing analysis of received hello packets is triggered upon receipt of a hello packet, steps 908, 910, 912, and 914. Where a hello packet is received from a challenging device in master confirm mode, step 910, it is analyzed to determine the data values contained therein, e.g., priority value for the VSRP switch that is transmitting the packet. Because multiple devices may simultaneously be in master confirm mode when the virtual switch is attempting to converge, e.g., enter its proper state with regard to other VSRP switches in the virtual switch, the VSRP switch may receive one or more hello packets, step 910. The number of potential hello packets is also a function of the number of devices comprising the virtual switch. The VSRP switch receives the hello packet or packets and performs a check to determine whether its priority is greater than that contained in any of the hello packet or packets, step 912.

Where the VSRP switch calculates that it has a higher priority than that contained in any analyzed hello packet, step 912, a hello packet is transmitted containing the VSRP switch's priority value, step 908, and this portion of the parallel process concludes until the next hello packet is received, step 910. If, however, the VSRP switch calculates that a received hello packet contains a greater priority value, step 912, the VSRP concludes that another device is the proper VSRP master for the virtual switch and therefore transitions into backup mode and sets its ports to blocking, step 914. The parallel process run by the software to maintain the timer mechanism, steps 906 and 908, is killed when the VSRP switch transitions to backup mode.

When a switch in the virtual switch transitions from master to backup the aware switch detects this condition by receiving the VSRP hello packet from a port different than the one that connects it to the old master. The aware switch transfers its MAC entries on the old master port to the new master port. This assists in quick failover recovery and data convergence which, in some embodiments, may be accomplished in a sub-second time frame.

In some embodiments, hello packets transmitted by switches in master or master confirm mode carry a hello timer which is communicated to the backup switches. The backup switches use the hello timer to synchronize their time values with those of the master switch. This further assists in stabilization of the network. Some embodiments further employ an authentication process for hello packets, wherein a password is sent with the hello packet, which gets authenticated at the receiving switch.

Figure 10:
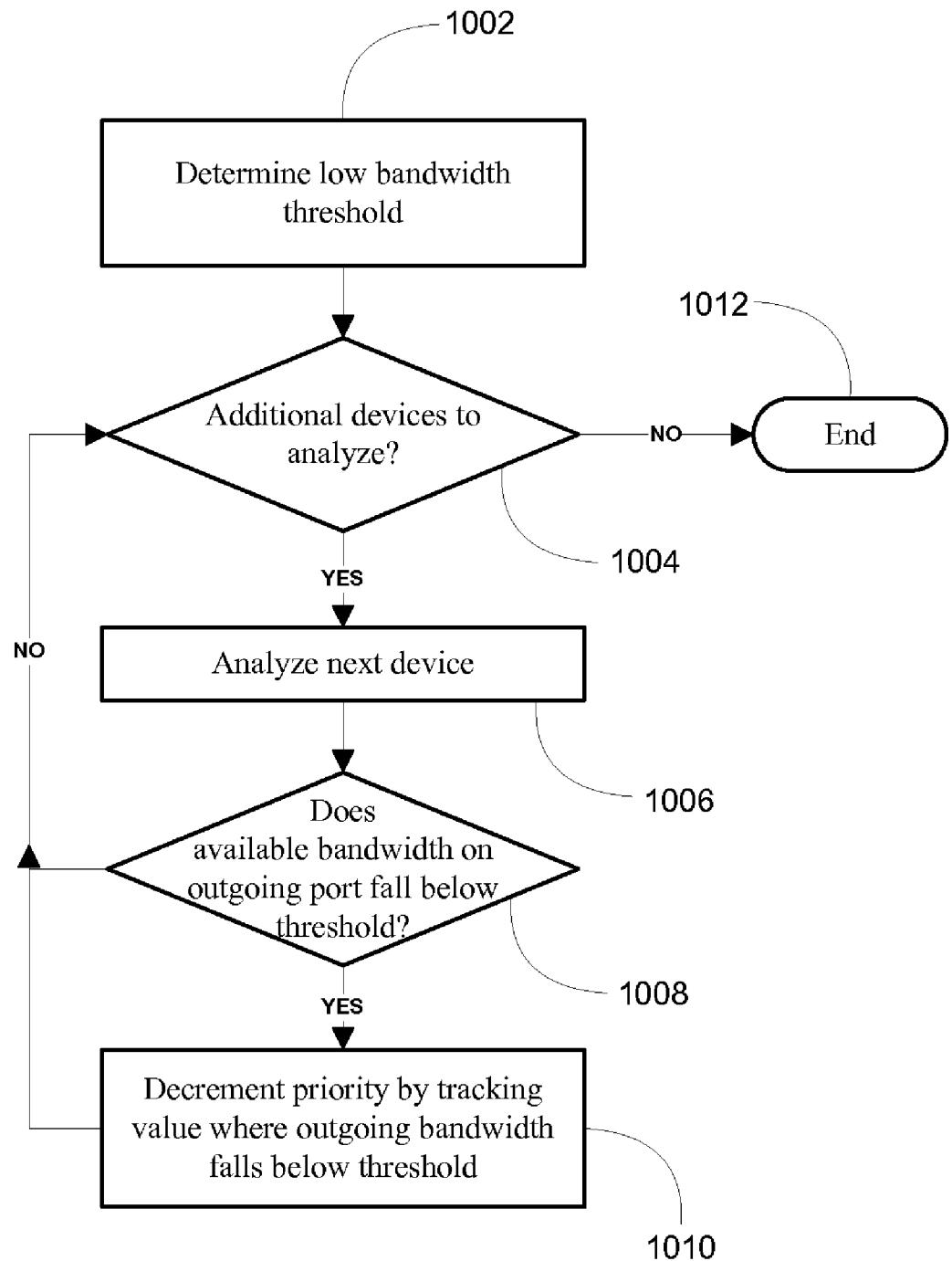
FIG. 10 is a flow diagram presenting a process for calculating a priority value corresponding to the outgoing bandwidth available on each VSRP device comprising a virtual switch according to one embodiment of the present invention.

As indicated previously, each VSRP device updates its priority value with regard to the quality of its outbound connection on an arbitrary or periodic basis. FIG. 10 presents an embodiment of a process executed by the VSRP switch to modify its priority value vis-à-vis available outbound bandwidth. Each VSRP switch is configured with a low bandwidth threshold value, which is retrieved from storage or memory, step 1002. This low bandwidth threshold may be set by a switch administrator using the CLI to set the parameter in the VSRP switch's software. Looking at the switches from any given virtual switch as a group, a check is performed to determine if additional VSRP switches need to execute the priority update, step 1004. It should be noted that software at each VSRP switch performs this analysis in parallel without input from other VSRP switches in the virtual switch or any other controlling device. The loop presented here, therefore, is for the purpose of clarity in the presentation only.

If more devices exist, step 1004, another device in the virtual switch is analyzed, step 1006. Software executed by the VSRP switch, e.g., priority calculation software, takes a measurement of the bandwidth available on the interface connecting the VSRP switch to the outside network or network segments, step 1006. A multitude of available techniques are well known to those skilled in the art for measuring the bandwidth available on a given link, for example, the Pathchar Algorithms, used in the tools pathchar and utimer, and the family of algorithms based on the Packet Pair algorithm used in the tools bprobe, cprobe, and tcpanaly. The measured bandwidth available to the VSRP switch is compared against the low bandwidth threshold set at the CLI, step 1006. Other techniques may be used to determine dynamically whether the update or decrease a switch's priority, such as a periodic "ping" to a known router outside the network to ensure a connection to the outside network, wherein the priority is decreased if the "ping" fails to go through.

A check is performed by software at the VSRP switch to determine if the calculation comparing the available bandwidth against the low bandwidth threshold results in the threshold being exceeded, step 1008. If the available bandwidth exceeds the threshold, the VSRP switch decrements its priority value by the tracking value, step 1010. As described above, the tracking value is a mechanism that allows a VSRP switch with poor bandwidth to the outside network to advertise this fact and allow it and other VSRP switches in the same virtual switch to take this into account when determining if they should be in master or backup mode. The tracking value is loaded into the VSRP switch's software by a switch administrator at the CLI. It should be noted that various types of aging mechanisms, such as are well known to those of skill in the art, may also be employed to increase the priority as available bandwidth improves.

Where the VSRP switch determines that the bandwidth available on its interface connecting it to the outside network or network segments does not exceed the low bandwidth threshold, step 1008, the priority value remains unmodified and the switch's analysis is complete for this iteration of the priority update. Program flow returns to step 1004 where a check is performed to determine if additional VSRP switches forming the virtual switch need to update their priority value. The subroutine ends when all devices in the virtual switch have been updated, step 1012.

Figure 11:
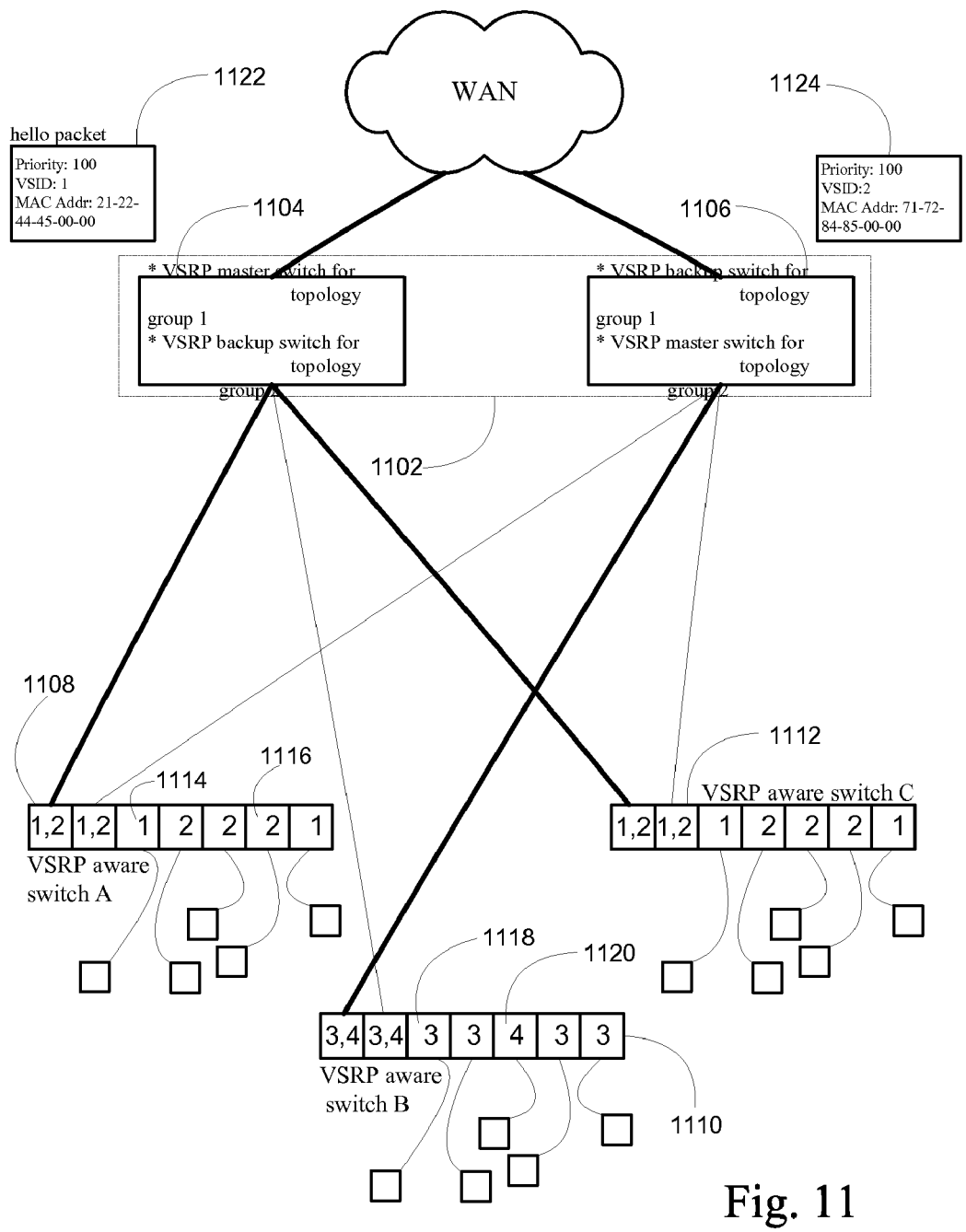
FIG. 11 is a block diagram presenting two VSRP devices acting as two virtual switches, each providing failover to different VLANs, according to one embodiment of the present invention.

The application of the present invention to the topology presented in FIG. 5 is built on with the topology presented in FIG. 11. As in the previous topology, several VSRP aware switches are provided 1108, 1110 and 1112. Each of the VSRP aware switches presented here 1108, 1110 and 1112 has partitioned its ports between two VLANs. VSRP aware switches A and C, 1108 and 1112 respectively, have assigned their ports to VLANs 1 (1114) and 2 (1116), whereas VSRP aware switch B 1110 has assigned its ports to VLANs 3 (1118) and 4 (1120). Traffic received on each of the VSRP aware switches 1108, 1110 and 1112 is not broadcast to every host physically connected to the switch. Instead, traffic is tagged as destined for a particular VLAN, with the VSRP aware switch broadcasting packets only to ports that are members of the target VLAN. Hosts attached to different physical LAN segments, therefore, appear as one logical LAN.

In this embodiment, two virtual switches are created from two physical VSRP switches 1104 and 1106, each of the virtual switches providing redundancy protection for a different group of VLANs. Each virtual switch 1102 is configured to provide failover protection for selected VLANs on the VSRP aware switches 1108, 1110, and 1112 by binding two VLANs into a single topology group, which is programmed at the VSRP switch's CLI interface, and assigning it to a virtual switch. To emulate multiple virtual switches on a single physical VSRP switch, each VSRP switch 1104 and 1106 is assigned a virtual switch identifier (VSID) for each virtual switch that the VSRP switch is a member of, each VSID is associated with a virtual switch and topology group. It should be noted that additional VSRP switches might be added to the virtual switch 1102 to provide additional failover capacity.

For each virtual switch that the VSRP switch is a member of, the VSRP switch acting as the VSRP master switch sets all its ports to forward data for the supported VLANs, represented by bold lines interconnecting the VSRP master switch with the VSRP aware switches 1108, 1110, 1112. All other VSRP switches in the stable virtual switch are set to backup mode, setting their ports to blocking (except for hello messages).

In the illustration of the present figure, topology group 1 comprises VLANs 1 and 2, whereas topology group 2 comprises VLANs 3 and 4. VSRP switch 1104 is the master VSRP switch for topology group one, while simultaneously acting as the VSRP backup switch for topology group 2. VSRP switch 1104, therefore, sets ports connected to VSRP aware switches A and C (topology group 1), 1108 and 1112, to forwarding and the ports connected to VSRP aware switch B (topology group 2) as blocking. Likewise, VSRP switch 1106 is the master VSRP switch for topology group two, while simultaneously acting as the VSRP backup switch for topology group 1. VSRP switch 1106, therefore, sets ports connected to VSRP aware switches A and C (topology group 1), 1108 and 1112, to blocking and the port connected to VSRP aware switch B (topology group 2) as forwarding. This is an excellent example of how the present invention provides the redundancy features of a protocol such as VRRP, as well as the benefits of a protocol such as STP by preventing undesirable network loops.

Putting it another way, the use of VRRP together with STP would result in the possibility that the same port would be selected to be blocking by STP but would ideally be forwarding under VRRP as the best route to a master. For example, if the switch connected to the master and backup switches is elected as the root switch in STP, it will set one of the master switch ports to blocking. However, use of VSRP rather than VRRP to provide redundancy and failover protection solves this problem, as described above.

Each VSRP switch in master mode 1104 and 1106 broadcasts hello packets 1122 and 1124 for each virtual switch in which the VSRP switch is a VSRP master. Other VSRP switches receive the hello packets 1122 and 1124 and act upon them if the receiving VSRP switch is a member of the virtual switch that the hello packet is destined for. If the receiving VSRP switch is a member of the virtual switch that the hello packet is destined for, the packet is used by the receiving VSRP switch's software. The VSRP switch's software extracts the data contained in the received hello packet to determine whether it should be in master mode, master confirm mode, or blocking mode for the given virtual switch that the hello packet belongs to (and of which the VSRP switch is a member). Where the VSRP switch receives hello packets for a virtual switch that the VSRP switch is not a member of, the packet is ignored. Alternatively, it may continue to be propagated throughout the network.

Each hello packet 1122 and 1124 comprises information regarding the transmitting VSRP switch's state and membership. The VSRP switch broadcasts hello packets for each virtual switch for which it is a master. Each broadcast hello packet is tagged with a virtual switch identifier (VSID) indicating the virtual switch to which it belongs and, therefore, the VLANs for which it is providing redundancy. These packets are acted on as is appropriate by other VSRP switches that are members of the same virtual switch, e.g., depending on the VSRP switch's current mode. Also of high importance is the priority value that the VSRP switch has, which is used by other VSRP switches in the virtual switch to determine if a mode change is appropriate. The data in hello packets for different virtual switches broadcast by the same physical device may be different.

As with other topologies configured according to the present invention, the VSRP switches 1104 and 1106 are symmetrically connected to the supported VSRP aware switches 1108, 1110, and 1112. Discrepancies in the number of connections to a particular VLAN between VSRP switches 1104 and 1106 that are members of the same virtual switch is reflected in the priority value. The priority value allows a VSRP switch to realize if the connection symmetry is broken for a particular virtual switch, at which VSRP switch or switches the break or breaks are occurring, and assist it in making a decision regarding the proper mode to be in for that virtual switch. The VSRP switches 1104 and 1106 may also export this data for utilization with other software applications that monitor and respond to network health issues.

In addition to the number of connections that a VSRP switch has to the virtual switch's neighbors, the priority value contained in the hello packet may be modified according to the relative quality of the switch's connection to the outside network or network segments for a given virtual switch. Each VSRP switch comprises a tracking value, not included as part of the data comprising the hello packet, which is used to modify the priority value as the quality of the outside connection fluctuates. In addition, other data is broadcast, such as the VSRP switch's MAC address, IP address, and other miscellaneous data that may be used by software executing on other switches in the virtual switch to deduce whether to transition into master or backup mode.

Each VSRP switch 1104 and 1106 broadcasts hello packets 1122 and 1124 for the virtual switches that it is a VSRP master for over its connected interfaces; hello packets are permitted transmission over blocked ports on a VSRP backup switch. Each VSRP aware switch 1108, 1110 and 1112 receives the hello packets. Each VSRP aware switch 1108, 1110 and 1112, floods the hello packet upon receipt, which is received by other VSRP switches due to the symmetrical nature of the topology. The VSRP switches act on the hello messages as is appropriate for each virtual switch. Alternatively, a direct link may be provided between VSRP devices 1104 and 1106 as a primary channel for transmission of hello packets to reduce extraneous administrative traffic on the network.

Figure 12:
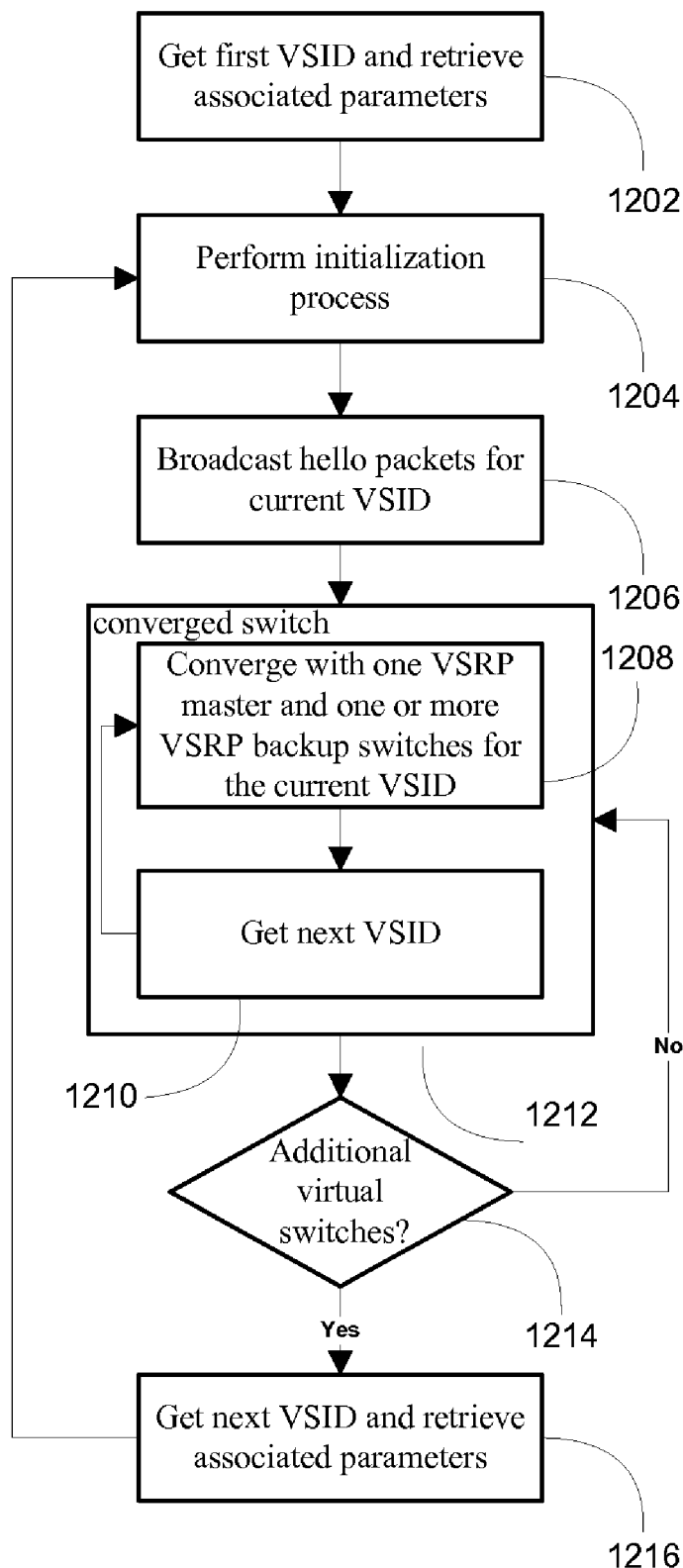
FIG. 12 is a flow diagram pressing a process for providing a converged virtual switch according to one embodiment of the present invention.

One exemplary embodiment of a process for operating a virtual switch configured according to FIG. 11 is presented in FIG. 12. As explained previously, each VSRP switch may be configured such that the VSRP switch is a member of more than one virtual switch. Before performing the startup initialization process presented in FIG. 6, the VSRP switch retrieves parameters for the first virtual switch of which it is a member, step 1202. Data associated with the currently selected virtual switch's virtual switch identifier (VSID) is used in generating hello packets and in analyzing received hello packets that are intended for the current virtual switch.

Upon retrieving data for the current VSID, in this instance the first virtual switch, the VSRP switch initializes itself for the current VSID, step 1204. As is apparent to those skilled in the art, the process executed by the VSRP switch in backup mode always results in every VSRP switch in virtual switch transitioning to master mode. Referring to the flow diagram presented in FIG. 7, no hello packets are ever received before the countdown process completes because all switches are initially in backup mode, as indicated in FIG. 6. This results in each VSRP switch transitioning to master confirm mode, wherein each VSRP switch transmits hello packets for the current VSID upon completion of the countdown process.

Continuing with the packet checking process of FIG. 9, each VSRP switch in the current virtual switch examines the set of received hello packets. Based on the results of its priority comparison check, each VSRP switch in the current virtual switch transitions into backup mode or remains in master mode and continues to broadcast hello packets to other VSRP switches, step 1208. This state of equilibrium, whereby a virtual switch has one VSRP master and one or more VSRP backup switches, is referred to as "convergence"—the virtual switch and each VSRP switch comprising it has converged at a stable configuration.

Step 1212 represents the sub-process executed by the VSRP switch for each converged virtual switch of which it is part. A VSRP switch executes the processes for the specific mode it is in for each virtual switch of which it is a member. When the first of several virtual switches that a VSRP switch is a member of converges, there is not a next converged virtual switch to retrieve for execution, step 1210. Put another way, as each virtual switch that a VSRP switch is a member of converges, the VSRP switch executes processes in a multi-threaded fashion according to the mode it is in for each virtual switch of which it is a member.

The VSRP switch performs a check to determine if it is a member of additional virtual switches, step 1214. Where there are additional virtual switches that must be initialized and converged, the VSRP switch loads data for the next virtual switch by retrieving parameters associated with the next virtual switch's VSID, step 1216. Program flow returns to step 1204 where the VSRP switch initializes itself vis-à-vis the current VSID. If, however, there are no additional virtual switches that the VSRP switch is a member of that require initialization and convergence, the VSRP switch continues to execute the processes associated with the mode it is in for each virtual switch in a multithreaded fashion, step 1212.

Figure 13:
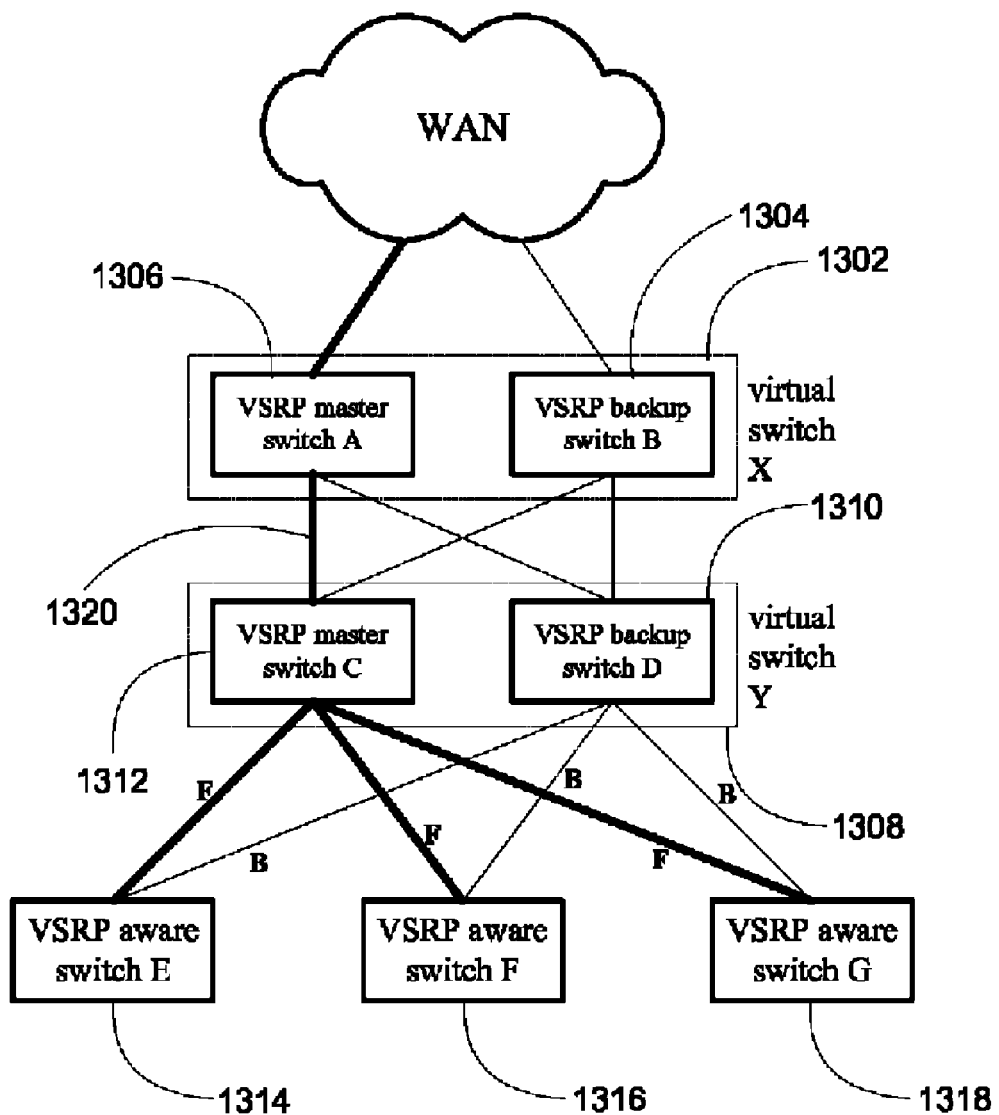
FIG. 13 is a block diagram presenting two virtual switches in a ladder configuration providing, one providing failover redundancy for the other, according to one embodiment of the present invention.

Another configuration of the invention is presented in FIG. 13. In this illustration, VSRP switches 1304, 1306, 1310, and 1312 are presented in a ladder configuration whereby one virtual switch 1302 is used to provide redundancy for another virtual switch 1308. Similarly to the topology configuration of the system illustrated at FIG. 5, several VSRP aware switches 1314, 1316, and 1318 are provided that typically perform Layer 2 aggregation and switching functionality. As has been explained throughout the specification, each of these Layer 2 devices 1314, 1316, and 1318 is "VSRP" aware, meaning it may properly operate with the failover functionality provided by the VSRP switches of the present invention. Each of these Layer 2 devices 1314, 1316, and 1318 may also be connected to one or more host devices, hubs, switches, bridges or other network interconnection devices.

The VSRP aware switches 1314, 1316, and 1318 are symmetrically connected to a pair of VSRP switches 1310 and 1312. The VSRP switches operate in concert whereby one device is in master mode 1312 and the other device is in backup mode 1310. In order to prevent network loops over the symmetric connections, the VSRP master 1312 sets its ports to forward network traffic while the VSRP backup 1310 blocks traffic over all its ports. By acting in concert to provide redundant network paths, while concurrently preventing network loops, the VSRP switches form a virtual switch 1308.

Also presented in this illustration is a second virtual switch 1302 configured so as to provide network route redundancy to the network core for the virtual switch 1308 that itself is providing redundant paths to the managed VSRP aware switches 1314, 1316 and 1318. As with other embodiments of the virtual switch, the VSRP switches 1304 and 1306 perform mode transitions, shown in FIGS. 6 through 10, and converge to a stable configuration whereby one VSRP switch is in master mode and other VSRP switches in the same virtual switch are in backup mode.

It should be noted that only one path between the two virtual switches 1302 and 1308 is depicted as forwarding data 1320. According to the converged virtual switch, a device in backup mode sets all its ports to blocking. Based upon this requirement, no network traffic except hello packets may traverse any data path that either begins or ends at a VSRP backup switch. Therefore, the data paths between VSRP master switch 1312 and VSRP backup switch 1304, VSRP master switch 1306 and VSRP backup switch 1310, and VSRP backup switch 1304 and VSRP backup switch 1310 are all blocked. According to the two converged virtual switches 1302 and 1308, only one path 1320 is available over which network traffic to and from the network core may pass. Unfavorable network loops are thereby avoided. Multiple virtual switches may be layered in this manner in order to provide a multiple levels of failover fault tolerance in providing a route to the network core.

As discussed above, the present invention is useful in attaching networks utilizing a virtual switch for a fault tolerant connection to Layer 2 loop free network, such as a spanning tree network, to provide fault tolerant communications between the two. Another example is a ring network, such as presented in FIG. 14 and described in commonly owned U.S. patent application Ser. No. 10/090,669, filed Mar. 4, 2002, now U.S. Pat. No. 6,717,922, entitled "NETWORK CONFIGURATION PROTOCOL AND METHOD FOR RAPID TRAFFIC RECOVERY AND LOOP AVOIDANCE IN RING TOPOLOGIES", said application being incorporated herein by reference. This application describes a specific ring network to which the present invention is suited for providing connectivity. As with previously presented topologies, a virtual switch 1402 is used to provide redundancy protection for a set of VSRP switches 1408 and 1410. The virtual switch 1402 comprises two VSRP switches operating in concert to provide this redundancy.

As has been explained in great detail, the VSRP switches 1404 and 1406 conduct regular elections to determine whether they should be in master mode (forwarding packets) or in backup mode (blocking packets) for each virtual switch 1402 to which they belong. In the present diagram, VSRP master switch 1404 is providing an open connection to the VSRP switches 1408 and 1410, while VSRP backup switch 1406 is waiting to take over in the event that the VSRP master fails. According to the present configuration of the invention, however, not all of the ports on the VSRP backup switch 1406 are set to blocking.

Figure 14:
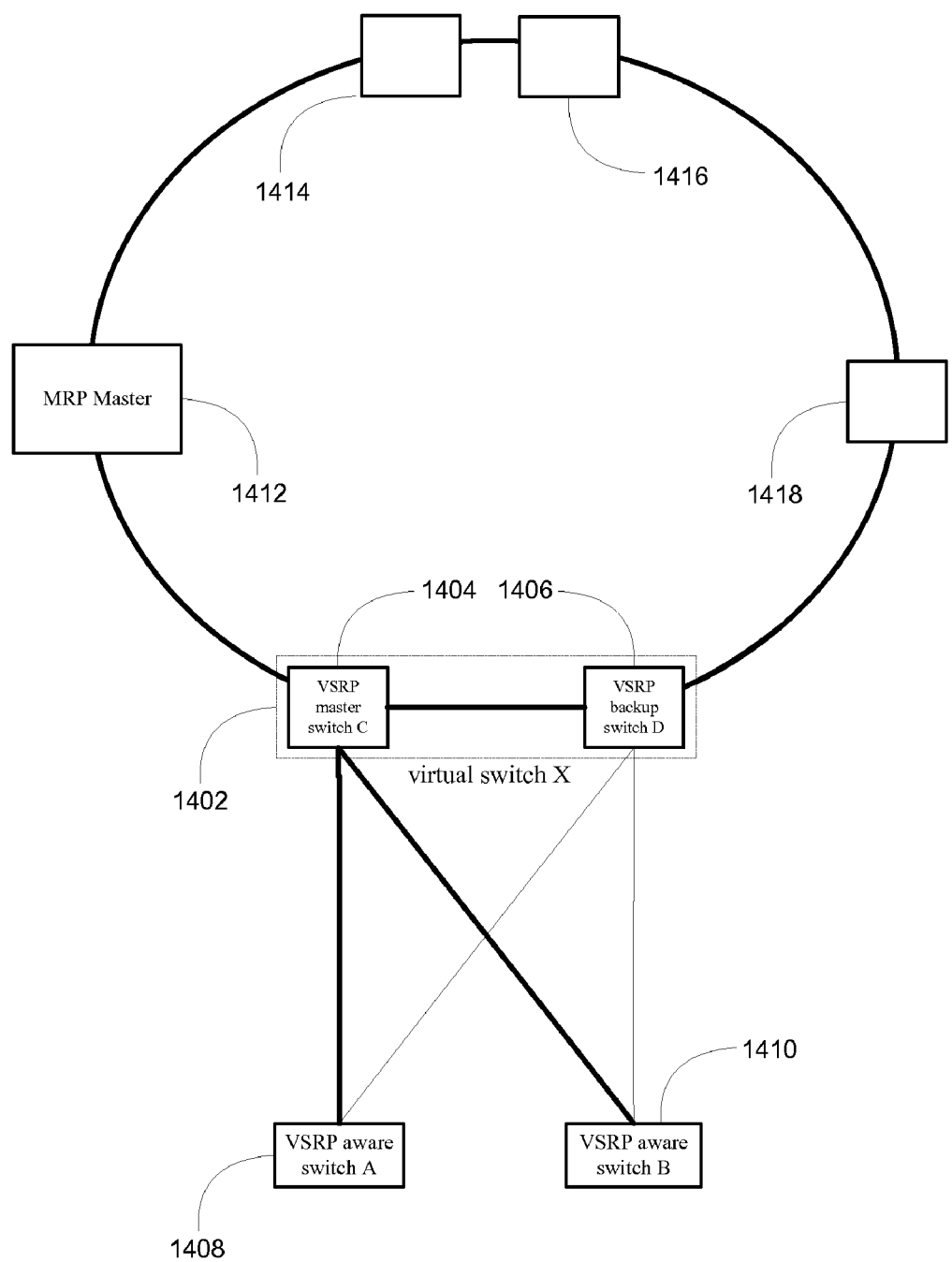
FIG. 14 is a block diagram presenting two VSRP devices comprising a virtual switch connected to a ring topology network according to one embodiment of the present invention.

Because the present invention is concerned about providing connection route redundancy to VSRP aware switches being managed by a virtual switch, each of the VSRP switches comprising the virtual switch must be connected to the outside network, in this case a ring topology. The ring topology, however, adds the additional constraint that, because data must be able to flow freely from the beginning to the end of the ring, data must always pass between both VSPR switches as shown by the bold interconnect between the two devices 1404 and 1406 and the ring. In other words, the interfaces exposed by a VSRP switch (or virtual switch) to the ring network must always be set to forwarding in order to preserve the continuity of the ring. Thus, the ports that interconnect the virtual switch will not be exposed to VSRP but rather only to the fault redundancy protocol operating within the ring, such as the metro ring protocol described in the above referenced application, or other network configuration, such as spanning tree protocol. In FIG. 14, for example, VSRP switches 1404 and 1406 each have their interconnecting ports and the port belonging to the ring topology controlled by the metro ring protocol, while the port connected to the VSRP aware switches 1408 and 1410 are controlled by VSRP. In a VLAN, some ports can belong to VSRP while others belong to the network's fault redundancy protocol.

Each VSRP device 1404 and 1406 in the virtual switch 1402 connected to the ring must have its interfaces that are exposed to the ring, and that are controlled by the ring's fault redundancy protocol, always set to forward data due to the implicit features of the ring topology. This implicit feature arises from the fact that a ring is defined as intact when data moves from a starting point on the ring (forwarding port) and arrives on the starting point's opposite interface connected to the other end of the ring (blocking port). A master device 1412 controls the ring network. Optimally, the start and end points of the ring should be the master's interfaces 1412, whereby one interface is set to blocking and the other is set to forwarding. Data passes through the ring from the master's forwarding port to other devices connected to the ring, 1414, 1416 and 1418. When the data gets to the VSRP backup switch 1406, the ring would be broken if the VSRP switch's interfaces exposed to the ring were set to blocking, thereby causing the master 1412 to reconfigure the ring to work around the fault and diminish the fault tolerance features of the virtual switch in providing a connection to the ring.

Using the CLI provided by each of the VSRP switches 1404 and 1406, a switch administrator instructs each VSRP switch 1404 and 1406 to keep all ports exposed to the ring network, regardless of whether it is in master or backup mode. In addition to the foregoing, a direct physical connection is provided between the VSRP switches 1402 and 1406. This direct connection is required due to the fact that without it the VSRP backup switch would have no other route to broadcast the packets passed over the ring because all its other ports are blocking. The interfaces used for this direct connection are also set to forwarding regardless of the VSRP switch's mode. Once wired and configured, the virtual switch provides redundancy functionality for the supported VSRP switches as previously explained through reference to various embodiments of the invention as presented in the accompanying figures.

Figure 15:
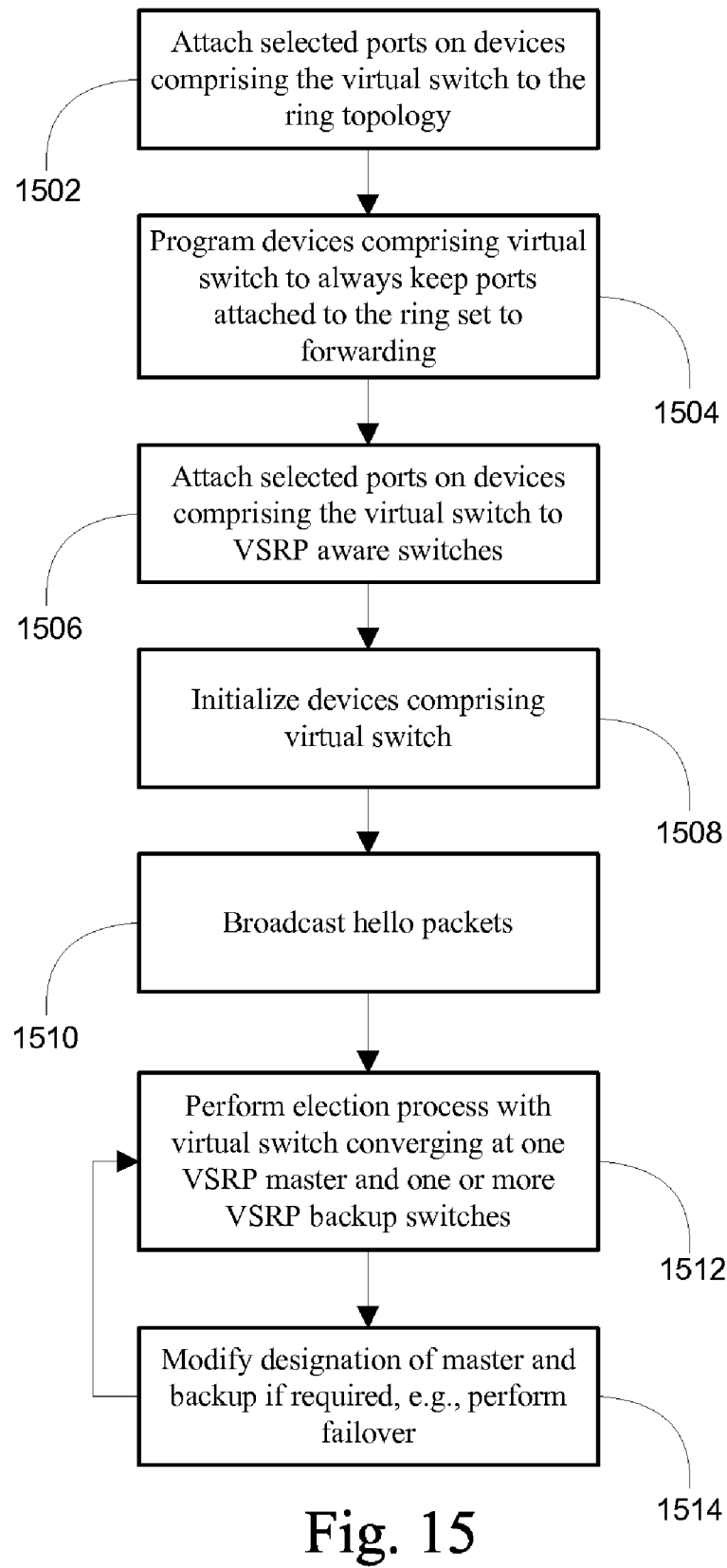
FIG. 15 is a flow diagram presenting a method for configuring and operating a virtual switch connected to a ring topology network according to one embodiment of the present invention.

A method of operating a virtual switch of the present invention in conjunction with a network configured according to a ring topology is shown in the flow diagram presented at FIG. 15. An administrator or other similar network engineer physically wiring the network identifies the ports comprising the VSRP switches in the virtual switch that constitute a portion of the ring topology, step 1502, which are interconnected to preserve the continuity of the ring topology. Using the command line interface provided by the software executing on each VSRP switch, a switch administrator instructs the software that the ports selected as connected to the ring topology, the ring protocol in turn, instructs these ports to be always set to forwarding, step 1504. These selected ports are removed from the scope of control that is exercised by the VSRP software over the ports on the switch, thereby allowing them to remain in a forwarding state regardless of whether the switch is in backup or master mode. At each VSRP switch, the administrator attaches ports selected for connection to the supported VSRP aware switches, e.g., ports forming the virtual switch, resulting in VSRP switches in the virtual switch being symmetrically connected to the supported VSRP aware switches, step 1506.

The VSRP switch is physically connected in the proper manner to the ring topology and supported VSRP switches, steps 1502 and 1506, and the ports are configured via the VSRP software's command line interface, step 1504. The switches comprising the virtual switch are initialized, e.g., reset or their power is cycled, in order to start the initialization process presented in FIG. 6, step 1508. Referring to the flow diagram presented in FIG. 7, no hello packets are ever received before the countdown process completes because all switches are initially in backup mode, as indicated in FIG. 6. This results in each VSRP switch transitioning directly to master mode, wherein each VSRP switch transmits hello packets for the current VSID upon completion of the countdown process as shown in FIG. 9, step 1510.

Continuing with the packet checking process of FIG. 9, each VSRP switch in the current virtual switch examines the set of received hello packets. Based on the results of its priority comparison check, each VSRP switch in the current virtual switch transitions into backup mode or remains in master mode and continues to broadcast hello packets to other VSRP switches, step 1512. Changes in the priority value of a VSRP switch in the virtual switch that impact which switch should be VSRP master and which switches should be VSRP backup causes the appropriate software processes in each switch to transition modes accordingly, step 1514, in order to maintain a stable converged configuration.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A network switch comprising:
    a plurality of ports,
    wherein the network switch is configured to act in concert with one or more other network switches as a virtual switch, the virtual switch being configured to provide route redundancy for a Layer 2 network,
    wherein, when operating in a first mode, the network switch is configured to forward all network data traffic received at the network switch and to transmit one or more redundancy control packets, and
    wherein, when operating in a second mode, the network switch is configured to block all network data traffic received at the network switch and allow receipt of redundancy control packets.

2. The network switch of claim 1 wherein the network switch is configured to communicate its status to the one or more other network switches via the one or more redundancy control packets.

3. The network switch of claim 2 wherein the one or more redundancy control packets are transmitted by being flooded throughout the Layer 2 network.

4. The network switch of claim 2 wherein the one or more redundancy control packets are transmitted via a direct link between the network switch and the one or more other network switches.

5. The network switch of claim 2 wherein each redundancy control packet includes a priority data value, the priority data value being based on a number of live connections between the network switch and devices in the Layer 2 network.

6. The network switch of claim 5 wherein the number of live connections is determined by broadcasting health check packets from the network switch to the devices in the Layer 2 network.

7. The network switch of claim 5 wherein the priority data value is further based on a quality of the live connections.

8. The network switch of claim 2 wherein each redundancy control packet includes a time-to-live data value, the time-to-live data value being decremented each time the redundancy control packet is transferred through a device in the Layer 2 network configured to interpret the redundancy control packet.

9. The network switch of claim 2 wherein each redundancy control packet includes an identifier identifying the virtual switch.

10. The network switch of claim 1 wherein, when operating in a third mode, the network switch is configured to block all network data traffic received at the network switch and allow receipt of redundancy control packets, and to transmit one or more redundancy control packets.

11. The network switch of claim 10 wherein the network switch is configured to transition between the first mode, the second mode, and the third mode based on priority data values included in redundancy control packets received at the network switch and a stored priority data value for the network switch.

12. The network switch of claim 1 wherein the Layer 2 network is a loop free network.

13. A network switch comprising:
    a plurality of ports for transmitting and receiving data packets,
    wherein the network switch is configured to transmit, via a port in the plurality of ports, a control packet including:
        an identifier identifying a virtual switch that the network switch is configured to be a member of; and
        a time-to-live data value that is decremented solely when the control packet is transferred through a network switch that is a member of the virtual switch.

14. The network switch of claim 13 wherein the virtual switch is configured to provide route redundancy for the Layer 2 network.

15. The network switch of claim 13 wherein the network switch is configured to be a member of a plurality of virtual switches.

16. The network switch of claim 15 wherein each virtual switch in the plurality of virtual switches is configured to provide route redundancy for a separate VLAN in the Layer 2 network.

17. A network device comprising:
    a memory component configured to store a priority value,
    wherein a hardware component of the network device is configured to:
        transition from a first mode to a second mode upon receiving a redundancy control packet including a priority value less than the stored priority value;
        transition from the second mode to a third mode if no redundancy control packet including a priority data value greater than the stored priority data value is received within a predetermined amount of time; and
        transition from the second mode or the third mode to the first mode upon receiving a redundancy control packet including a priority value greater than the stored priority value.

18. The network device of claim 17 wherein, when operating in the first mode, the network device is configured to block all network traffic received at the network device except for redundancy control packets.

19. The network device of claim 17 wherein, when operating in the second mode, the network device is configured to block all network traffic received at the network device except for redundancy control packets, and to transmit one or more redundancy control packets.

20. The network device of claim 17 wherein, when operating in the third mode, the network device is configured to forward all network traffic received at the network device and to transmit one or more redundancy control packets.

21. The network device of claim 17 wherein the network device is a switch usable in a virtual switch comprising a plurality of switches, the switch being configured to act in concert with one or more other switches in the plurality of switches to provide route redundancy for a Layer 2 network.

* * * * *